(12) United States Patent
Wilk

(10) Patent No.: US 10,976,261 B1
(45) Date of Patent: Apr. 13, 2021

(54) APPARATUS AND METHOD OF REMOTE PROSPECTING

(71) Applicant: Peter Wilk, New York, NY (US)

(72) Inventor: Peter Wilk, New York, NY (US)

(*) Notice: Subject to any disclaimer, the term of this patent is extended or adjusted under 35 U.S.C. 154(b) by 0 days.

(21) Appl. No.: 16/712,346

(22) Filed: Dec. 12, 2019

(51) Int. Cl.
*G01N 21/00* (2006.01)
*G01N 21/76* (2006.01)
*G01J 3/28* (2006.01)
*G06T 7/00* (2017.01)
*G01N 21/84* (2006.01)

(52) U.S. Cl.
CPC ............ *G01N 21/76* (2013.01); *G01J 3/2823* (2013.01); *G01N 21/84* (2013.01); *G06T 7/0008* (2013.01); *G01N 2021/8466* (2013.01); *G06T 2207/30188* (2013.01)

(58) Field of Classification Search
CPC ............... G01N 21/76; G01N 21/84; G01N 2021/8466; G01J 3/2823; G01J 3/28; G01J 3/02; G01J 3/00; G01J 3/18; G06T 7/0008; G06T 2207/30188
See application file for complete search history.

(56) References Cited

U.S. PATENT DOCUMENTS

2007/0218556 A1* 9/2007 Harris .................. G01N 21/718
436/25

* cited by examiner

*Primary Examiner* — Abdullahi Nur
(74) *Attorney, Agent, or Firm* — Lawrence B. Goodwin, PLLC

(57) ABSTRACT

A method of detecting a mineral or metal in ground includes capturing an image of a target region of the ground and processing the image to determine a location of a candidate rock or plant of interest that is known to be usable for the detection of a mineral or element of interest. Once located, electromagnetic radiation, such as a laser, is directed to the candidate rock or plant to create a light signature, such as by vaporization. The method analyzes the light signature for the presence of the mineral or metal in the target region and determines if the light signature indicates the mineral or metal is present in the ground. The light signature can be analyzed with a spectroscope to detect the mineral or element as an indication of the present of the mineral or element in the ground around or below the candidate rock or plant.

50 Claims, 18 Drawing Sheets

APPARATUS AND METHOD OF REMOTE PROSPECTING

FIELD

Illustrative embodiments of the invention generally relate to mineral prospecting and, more particularly, illustrative embodiments relate to locating rocks or plants present at or near the surface of the ground and remotely testing the rocks or plants using electromagnetic radiation to generate a light signature indicative of the elements or miners contained in the rocks or the ground below the plants.

BACKGROUND

Geological veins are sheet-like formations of crystallized minerals found within rock. Geological veins form within rock as water carries these minerals through the ground, depositing them within the rock. The mineral deposits of geological veins often include precious metals, such as gold, silver, ruthenium, rhodium, palladium, osmium, uranium, and iridium, as well as gemstones, such as chrysoberyl, quartz, beryl, garnet, moonstone, apatite, diamond, spinel, tanzanite, tourmaline, topaz, and zircon.

Due to their nature, most geological veins lay underground and their detection from aboveground remains difficult. Determining whether a geological vein possesses valuable metals requires costly excavation and extraction of the mineral deposit, followed by laboratory testing. Imaging spectroscopy (also referred to as hyperspectral remote sensing) is a technology that has been utilized with success for mapping vegetation and mineral abundances over many areas of the Earth's surface using reflected sunlight.

SUMMARY

The present disclosure provides for system and methods of remote prospecting using an image-based detection system to location candidate rocks or plants that are likely to contain an element or mineral of interest based on their visual signatures in a camera image. Once a candidate rock or plant is detected and located, remoted testing of the candidate rock or plant is conducted using electromagnetic radiation (e.g., a laser), that cases the candidate rock or plant to emit a light signature that is detected an analyzed using, for example, spectroscopy to identify the specific minerals or elements in the candidate rock or plant, which are indicative of the presents of the specific minerals or elements in the ground near or below the tested plant or rock. In the case of detecting plants, the visual signature can be used, for example, to detect a specific plant that is known to be a strong accumulator of a specific element or mineral from the ground (e.g., a hyperaccumulator, such as *Pistia stratiotes, Arabidopsis,* and *Brassicaceae*). Many such plants are known, some of which have the capacity to uptake and sequester metals such as silver, cobalt, iron, copper, cadmium, lead, mercury, selenium, manganese, zinc, molybdenum and nickel in 100 to 10,000 times the concentration found traditional species. In the case of detecting rocks, the visual signature can be, for example, a specific pattern or color that could be identifiable as a particular oxide state or a vein or inclusion in a larger rock formation.

Many possible testing methods are considered, including using a high-powered laser to cause a vaporization and/or oxidation of a portion of the candidate plant or rock. Examples of this technique are disclosed in the Applicant's U.S. Pat. No. 10,222,338, APPARATUS AND METHOD OF DETECTING A MINERAL IN SOIL, filed Apr. 10, 2018, the contents of which are hereby incorporated by reference. Additionally, less powerful radiation can be used to investigate rocks, such as visible/near-infrared (VNIR) and short-wave-infrared (SWIR) spectroscopy (also referred to as hyperspectral remote sensing) have been utilized with success for mapping vegetation and mineral abundances over many areas of the Earth's surface. Existing spectroscopy methods and device can be used after camera-identification of a candidate rock to identify certain minerals or elements present in the rock based on their absorptions or emission in response to received electromagnetic radiation. Examples of this technique are disclosed in the Applicant's U.S. patent application Ser. No. 16/555,551, APPARATUS AND METHOD OF DETECTING A MINERAL IN THE GROUND, filed Aug. 29, 2019, the contents of which are hereby incorporated by reference.

Certain embodiments of the present disclosure provide for devices and methods of investigating surface geology using a camera, processing the image to detect a desired rock region, and subsequently remotely testing the rock region using electromagnetic radiation to produce a light signature which is indicative of an element or mineral in the rock. An example method includes an image of a target region of the surface of the ground, the target region having exposed rock, processing the image to detect a visual signature indicative of the presence of a mineral or metal in the exposed rock, determining a candidate location in the target region having the visual signature, transmitting electromagnetic radiation to exposed rock in the candidate location to produce a light signature, receiving electromagnetic energy from the target region including the light signature, analyzing the light signature for the presence of the mineral or metal in the candidate location, and determining that the light signature indicates the mineral or metal is present in the ground. Transmitting electromagnetic radiation to the rock can cause a chemical reaction to occur in the rock the light signature is produced by the chemical reaction. In some examples, the chemical reaction includes vaporization of a portion of the rock in the candidate location into a plasma and the light signature is produced by the plasma. The visual signature can be a color or pattern indicative of the mineral or metal.

The method can include transmitting electromagnetic radiation to rock with a frequency that is absorbed by the mineral or metal in the rock, with the light signature being produced by the absorption of the electromagnetic radiation. The method can include transmitting electromagnetic radiation to rock with a frequency that causes fluorescence of one or more frequencies in a mineral present in the rock and the light signature includes the one or more frequencies of the fluorescence. The light signature can be detected using spectroscopy.

In some examples, the electromagnetic radiation is transmitted to the rock from an energy source including a microwave device or a laser. In some examples, the electromagnetic radiation is directed to the rock using a handheld device. In some examples, the electromagnetic radiation is directed to the rock while flying over the target region.

The method can include determining a location of the rock in the candidate region. In some examples, determining a location of the rock or the candidate region includes receiving a GPS location where the image was captured and calculating a location of the rock in the candidate region based on the GPS location.

The method can include adjusting a property of the electromagnetic radiation based on the visual indication. In some examples, processing the image to detect the visual signature includes interfacing with a database of visual signatures for a plurality of minerals and metals and comparing the captured image against the database.

Another example of the present disclosure is a system for detecting a mineral or metal, the system having a rock-locating apparatus including and a rock-testing apparatus. The rock-locating apparatus can include a camera capable of capturing an image of a target region of the surface of the ground, the target region having exposed rock, an image processor configured to detect a visual signature indicative of the presence of a mineral or metal in the exposed rock, and determine a candidate location in the target region having the visual signature, and an output configured to transmit the location of the candidate location. The rock-testing apparatus can include an input capable of receiving the location of the candidate location, an energy source capable of transmitting electromagnetic radiation to exposed rock in the candidate location to produce a light signature, and a spectroscope configured to receive and analyze the light signature and determine whether the light signature is indicative of the mineral or metal.

The energy source can be capable of transmitting electromagnetic radiation to the exposed rock for causing a chemical reaction to occur in the rock, and where the light signature is produced by the chemical reaction. In some examples, the energy source is capable of causing vaporization of a portion of the rock in the candidate location into a plasma, and where the light signature is produced by the plasma. In some examples, the energy source is capable of transmitting electromagnetic radiation to the exposed rock with a frequency that is absorbed by the mineral or metal, and where the light signature is produced by the absorption of the electromagnetic radiation. In some examples, the energy source is capable of transmitting electromagnetic radiation to the exposed rock with a frequency that causes fluorescence of one or more frequencies in a mineral present in the rock and the light signature includes the one or more frequencies of the fluorescence. In some examples, energy source is a microwave device or a laser.

At least one of the rock-locating apparatus or the rock-testing apparatus can be sized and shaped to be operated as a handheld device. At least one of the rock-locating apparatus or the rock-testing apparatus can be configured to operate while flying over the target region.

In some examples, the visual signature includes a color or pattern indicative of the mineral or metal.

The rock-locating apparatus can include a processor for determining a location of the rock in the candidate region. In some examples, the rock-locating apparatus includes a GPS unit configured to receive a GPS location of the rock-locating apparatus, and the processor can be configured to calculate a location of the rock in the candidate region based on the GPS location. In some examples, the processor is configured to calculate a location of the rock in the candidate region based on the GPS location and the received light signature when the rock-testing apparatus is positioned with the rock-locating apparatus. In some examples, the rock-locating apparatus includes a database of visual signatures for a plurality of minerals and metals, and the image processor can be configured to interface with the database and comparing the captured image against the database configured to detect the visual signature.

The rock-testing apparatus can be configured to receive the visual signature from the rock-locating apparatus and adjust a property of the electromagnetic radiation based on the visual indication. The system can include a housing containing the rock-testing apparatus and the rock-locating apparatus.

Another example is method of locating a mineral or metal in the ground including capturing an image of a target region of a plot of land, processing the image to detect a plant rooted in in the target region capable of accumulating a mineral or metal from the plot of land, determining a candidate plant of the target region based on the detecting, transforming the candidate plant by causing at least a portion of the candidate plant to burn to produce a light signature, analyzing the light signature for the presence of the mineral or metal in the candidate plant, and determining that the light signature indicates the mineral or metal is present in the candidate plant. The light signature can be detected using spectroscopy, and the mineral or metal can be selected from the group consisting of gold, silver, ruthenium, rhodium, palladium, osmium, iridium, magnesium, and manganese. The method can include determining a location of the candidate plant in the ground.

Transforming the plant can include directing an energy source onto the at least a portion of the plant while the plant is rooted in the plot of land. The energy source can be a microwave device, or a laser. The energy source can be directed to the at least a portion of the plant using a handheld device. The energy source can be directed to the at least a portion of the plant while flying over the plant.

Yet another example is system for detecting a mineral or metal having a plant-locating apparatus and a plant-texting apparatus. The plant-locating apparatus having a camera capable of capturing an image of a target region of a plot of land, an image processor configured to determine the presence and location of a candidate plant rooted in the target region that is capable of accumulating a mineral or metal from the plot of land, and an output configured to transmit the location of the candidate plant. The plant-testing apparatus can include an input capable of receiving the location of the candidate plant, an energy source capable of transforming the candidate plant by causing at least a portion of the plant to burn to produce a light signature, and a spectroscope configured to analyze the light signature and determine whether the light signature is indicative of the mineral or metal.

The spectroscope can include a comparator to compare the light signature to a known light signature of the mineral or metal. The spectroscope can include a comparator to compare the light signature to a known light signature of the mineral or metal.

The mineral or metal can be selected from the group consisting of gold, silver, ruthenium, rhodium, palladium, osmium, iridium, magnesium, and manganese.

The energy source can be a microwave device or a laser. The system can include a housing containing the plant-testing apparatus and the plant-locating apparatus.

In some examples, at least one of the plant-locating apparatus or the plant-testing apparatus is handheld. In some examples, at least one of the plant-locating apparatus or the plant-testing apparatus is configured to be coupled to an aircraft.

The plant-locating apparatus can include a processor for determining a location of the plant in the candidate region. In some examples, the plant-locating apparatus includes a GPS unit configured to receive a GPS location of the plant-locating apparatus, and the processor can be configured to calculate a location of the plant in the candidate region based on the GPS location. In some examples, the processor is configured to calculate a location of the plant in the candidate region based on the GPS location and the received light signature when the plant-testing apparatus is positioned with the plant-locating apparatus.

In some examples, the plant-locating apparatus includes a database of visual signatures for a plurality of minerals and metals, and the image processor can be configured to interface with the database and compare the captured image against the database to detect the visual signature.

The plant-testing apparatus can be configured to receive the visual signature from the plant-locating apparatus and adjust a property of the electromagnetic radiation based on the visual indication.

In accordance with one embodiment of the invention, a method of detecting a mineral or metal in soil causes at least a portion of a plant to burn to produce a light signature. The method also analyzes the light signature for the presence of the mineral or metal in the plant and determines if the light signature indicates the mineral or metal is present in the plant.

The light signature may be detected using spectroscopy and the mineral or metal may be gold, silver, ruthenium, rhodium, palladium, osmium, iridium, magnesium, or manganese. A user causes the plant to burn by directing an energy source onto at least a portion of the plant. The energy source may be a microwave, or a laser, and may be directed to at least a portion of the plant using a handheld device. Among other ways, the energy source is directed to the at least a portion of the plant while flying over the plant.

In accordance with another embodiment of the invention, an apparatus for detecting a mineral or metal includes an energy source that is able to cause at least a portion of a plant to burn to produce a light signature. The apparatus also includes logic configured to analyze the light signature for the presence of the mineral or metal in the plant and to determine if the light signature indicates that the mineral or metal is present in the plant. Additionally, the apparatus includes a spectroscope that is configured to determine if the light signature is indicative of the mineral or metal of interest.

The apparatus may also be coupled to an aircraft, such as a helicopter, airplane, drone, autogyro, air balloon, or blimp, a hand-held device, or a land-based movable device (e.g., an automobile or similar device).

Certain embodiments of the present disclosure provide for devices and methods of investigating surface geology using a device emitting electromagnetic radiation (e.g., light) in order to detect specific minerals or metals in the surface geology by detecting the absorption patterns caused by the emitted light reflecting or scattering off the surface geology or detecting the emission patterns of the minerals in response to the emitted light (e.g. fluorescing). For example, embodiments include searching for gemstones, such as emeralds, in surface geology, by first illuminating a target region of the surface geology, receiving light from the target region, and then searching for absorption lines at 680 nm and 683 nm or broadband absorption in the violet region of the received light. In other examples, the emitted light can be a single frequency or narrow band light (e.g., from a laser) that corresponds to a specific absorption region of a desired mineral, or, in other examples, of a specific fluorescence region, whereby the desired mineral to be detected emits light by fluorescence in response to being exposed to light of a specific frequency. Illustrative embodiments include using an image sensor to receive the light from the target region and provide the user with a view of the target region indicating where a positive detection of a desired mineral has been found. Embodiments include detecting two or more minerals in the target region based on detected differences in the absorption or emission spectra received from the target region while the target region is illuminated with a light source.

In accordance with one embodiment of the invention, a method of detecting a mineral or metal in soil causes at least a portion of the ground to emit, reflect, or absorb a light signature corresponding to the presence of one or more minerals. The method also analyzes the light signature for the presence of the mineral or metal and determines if the light signature indicates the mineral or metal is present in the ground.

The light signature received from the ground may be detected using spectroscopy and the mineral or metal may be chrysoberyl, quartz, beryl, garnet, moonstone, apatite, diamond, spinel, tanzanite, tourmaline, topaz, and zircon. A user causes the ground to be illuminated by directing an energy source onto at least a portion of the ground. The energy source may be a microwave, or a laser, and may be directed to at least a portion of the ground using a handheld device. Among other ways, the energy source is directed to the at least a portion of the ground while flying over the ground.

In accordance with another embodiment of the invention, an apparatus for detecting a mineral or metal includes an energy source that is able to cause a mineral to fluoresces to by absorbing a specific frequency of light to produce a light signature of a different frequency. The apparatus also includes logic configured to analyze the light signature for the presence of the mineral or metal in the ground and to determine if the light signature indicates that the mineral or metal is present in the ground. Additionally, the apparatus includes a spectroscope that is configured to determine if the light signature is indicative of the mineral or metal of interest.

The apparatus may also be coupled to an aircraft, such as a helicopter, airplane, drone, autogyro, air balloon, or blimp, a hand-held device, or a land-based movable device (e.g., an automobile or similar device).

Yet another example is method of locating a bone or fossil in the ground including capturing an image of a target region of a plot of land, processing the image to detect a rock formation or soil layer in in the target region likely or capable of containing bone or fossilized remains of plant or animal life, determining a candidate plant of the target region based on the detecting, testing a portion of the rock formation or layer by causing at least a portion of the rock formation or soil layer to produce a light signature, analyzing the light signature for the presence of the bone or fossil in the candidate rock formation or soil layer, and determining that the light signature indicates the bone or fossil is present in the candidate rock formation or soil layer. The light signature can be detected using spectroscopy, and the bone or fossil can be detected using, for example, the detection or absorption of light in the range of 800 to 2000 nm using known scattering properties and absorption coefficients of bone. In other examples, the light signature is produced using a high energy electromagnetic wave to cause at least a portion of the candidate rock formation or soil layer to burn or vaporize and the light signature is analyzed for spectral features indicative of bone or fossilized material in the rock formation or soil layer. The method can include determining a location of the bone or fossil in the ground. In some instances, the method includes visually processing the image to identify a geologic boundary (e.g. the Cretaceous- Paleogene boundary, or K-T boundary) in the rock formation or soil layer and the analyzing the rock or soil layers above the identified K-T boundary.

BRIEF DESCRIPTION OF DRAWINGS

This disclosure will be more fully understood from the following detailed description taken in conjunction with the accompanying drawings, in which.

DETAILED DESCRIPTION

Figure 1:
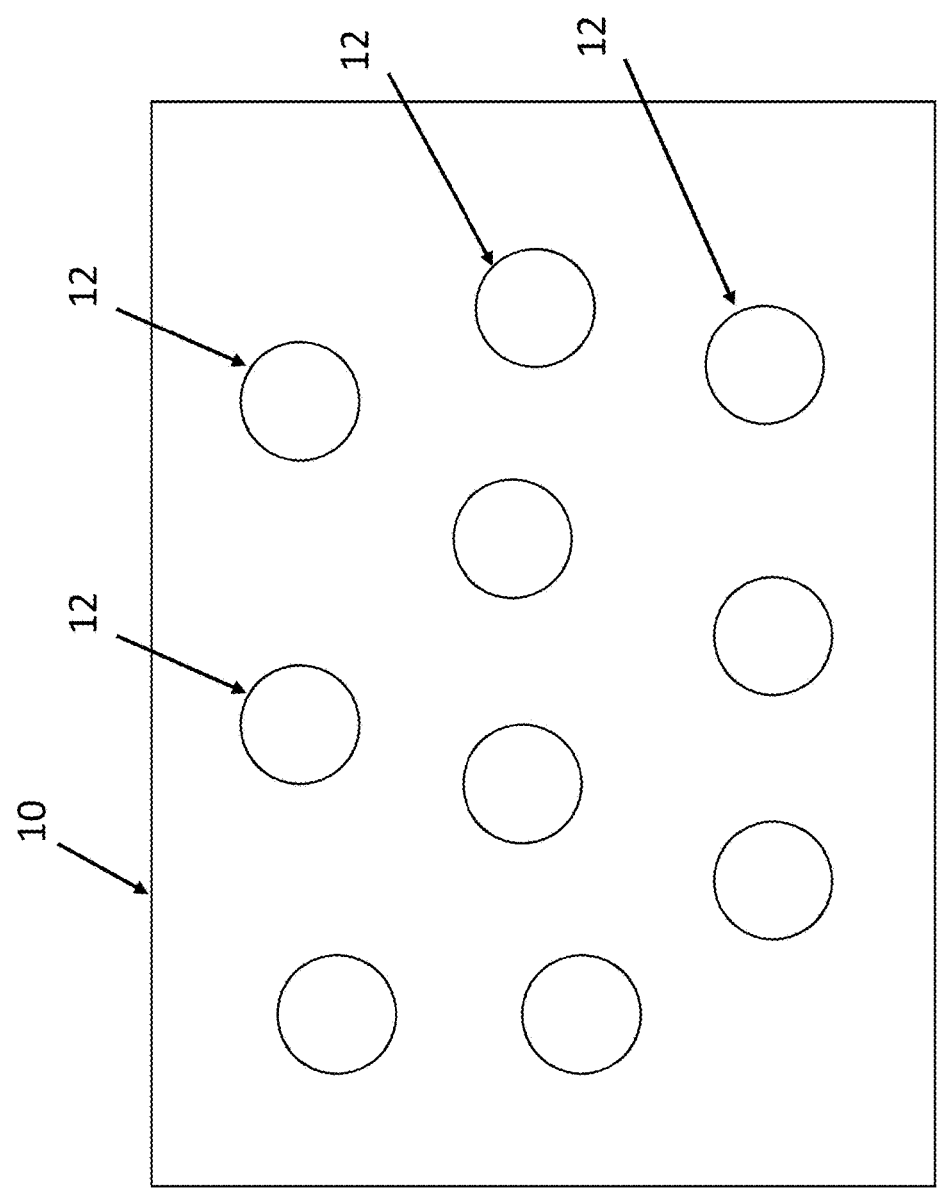
FIG. 1 schematically shows a plot of land that may be analyzed for underground geological mineral veins containing a mineral or metal of interest.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

In illustrative embodiments, an apparatus and method detect underground geological veins containing minerals, including metals. To that end, illustrative embodiments interrogate surface regions or plant materials above potential underground geological mineral veins using imaging techniques to detect candidate rocks or plants, which then remotely tested using electromagnetic radiation for the presence of at least trace amounts of the desired minerals. A ground surface preferably is first interrogated by capturing a high-resolution image of a target region it. The image is then processed to identify candidate rocks or plants which are to be tested. Subsequently, electromagnetic radiation, such as from a laser or microwave emitter, is narrowly directed to the candidate rock or plant where it causes a light source to be created from the material of the plant or rock that received the electromagnetic radiation. A light source analyzer, such as a spectrophotometer (which can include an image sensor), remotely (e.g., from the location of the emitter and/or camera) observes the light source and determines the mineral or element composition of the candidate rock or plant. Based on this, information regarding the overall presence of minerals or elements in the ground surrounding or below the tested candidate rocks or plants can be determine and mapped in order to, for example, facilitate future excavation and mining of the minerals or elements. Examples also include generating a map of the region containing the positive detections along with a determined indication of likelihood of the ground containing the detected mineral or element, and in what amounts.

In some examples, the detection includes remotely testing surface rocks using the resultant emission or absorption of electromagnetic radiation in response to the electromagnetic radiation directed to the surface rocks after visually determining them as candidate rocks of interest. In this case, electromagnetic radiation (e.g., light from a light source) is directed to at least a portion of the ground containing the surface rock formation of interest, or can be narrowly directed to the rock formation itself, causing the surface rock to absorb one or more distinct frequencies of the light. The spectrum of light absorbed by the surface rock is analyzed for the spectral signature of the mineral or metal of interest. In one example, a narrow-band or single-frequency light source is used to illuminate the surface rock formation, where the narrow-band or single-frequency corresponds to an absorption spectrum of a mineral of interest. Continuing, image sensors tuned to detect absorption of that narrowband or single-frequency of light are used to determine if, and where, the mineral of interest is present in the surface rock based on any detected absorption spectrum. Detection of the spectral signature of the mineral of interest indicates the presence of the mineral in the surface rock formation and suggest that a geological vein possessing the mineral or metal of interest likely lies underneath or near the interrogated surface area. Details of illustrative embodiments are discussed below.

Accordingly, examples also include investigating rocks formation or plants underwater that can be observed either visually through the surface of the water, or by a locating device placed underwater and directed the electromagnetic radiation to the rock formation or plants through the water.

Geological mineral veins typically lie underground and the detection of underground geological veins including specific minerals remains technically difficult without excavation of the land. Undesirably, land excavation can be costly, particularly due to the somewhat speculative nature of mineral exploration. Current technology known to the inventor cannot efficiently solve this problem. The inventor recognized this technical problem and discovered a different, more efficient technology for locating minerals. One such embodiment is described below.

FIG. 1 schematically shows a plot of land 10 that may be analyzed for detecting the presence of minerals or metals visible at or near the surface or plants, such as a superaccumulators, which can be subsequently tested to indicate underground geological mineral veins containing the detected mineral or metal of interest. It should be expressly noted that unless expressly noted otherwise, the term "mineral" is used herein to include metals. Open circles on the figure denote segments 12 of the ground that are visible at the surface, which will be imaged using the methods described below. A person of ordinary skill in the art will appreciate that a segment 12 can be larger or small and embodiment include continuously scanning the ground 10.

Figure 2:
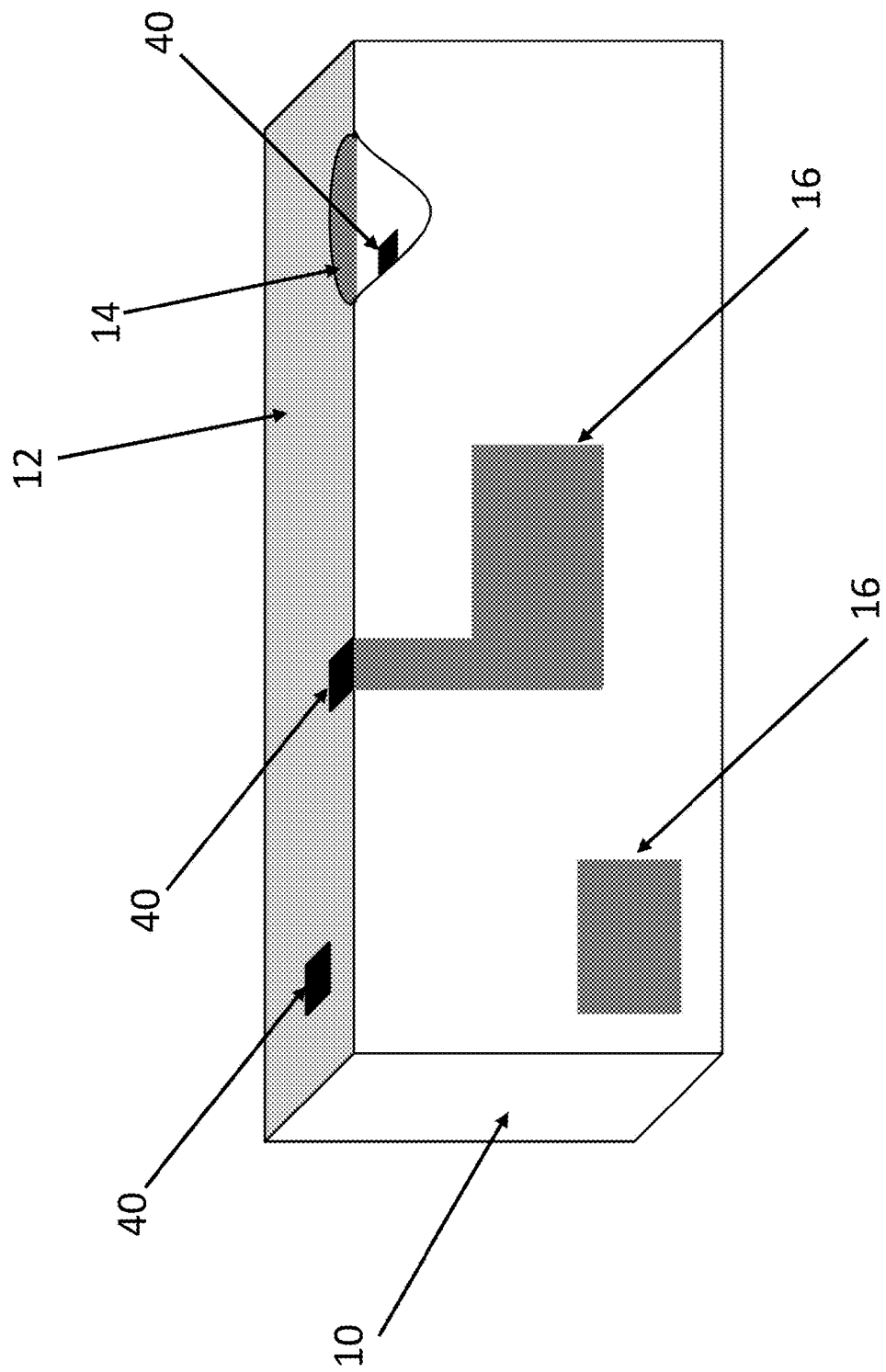
FIG. 2 schematically shows an exemplary cross-section of a target region containing minerals above a geological mineral vein.

FIG. 2 shows a cross-sectional view of an exemplary target region 12 above a geological mineral vein 16, showing individual rocks 40 exposed at or near the surface of the target region 12. Indeed, this figure is schematic and intended merely to illustrate an example of one application of various embodiments. The figure also shows a pool 14 of water in which a mineral 14 is disposed. Various embodiments of the present disclosure detect minerals in rocks 40 located beneath water 14 found in the target region 12 where light is able to pass through the water 14 and a light signature from the mineral 40 is able to be detected though light received from the rocks 40 in the water 14. Rocks 40 in the target region can either indicate the presence of a mineral vein 16 below or nearby or be an exposed region of a larger mineral vein 16 that extends below the surface of the target region 12. Geologic processes in the target region 12 can assimilates and distributes minerals in rock formations 40 from the mineral vein 16 across surface of the target region 12. The inventor recognized that even a trace detection of a mineral in a rock 40 in the target region 12 can be used to more efficiently and effectively identify the location of the vein 16 of minerals beneath the surface of the ground.

Figure 3A:
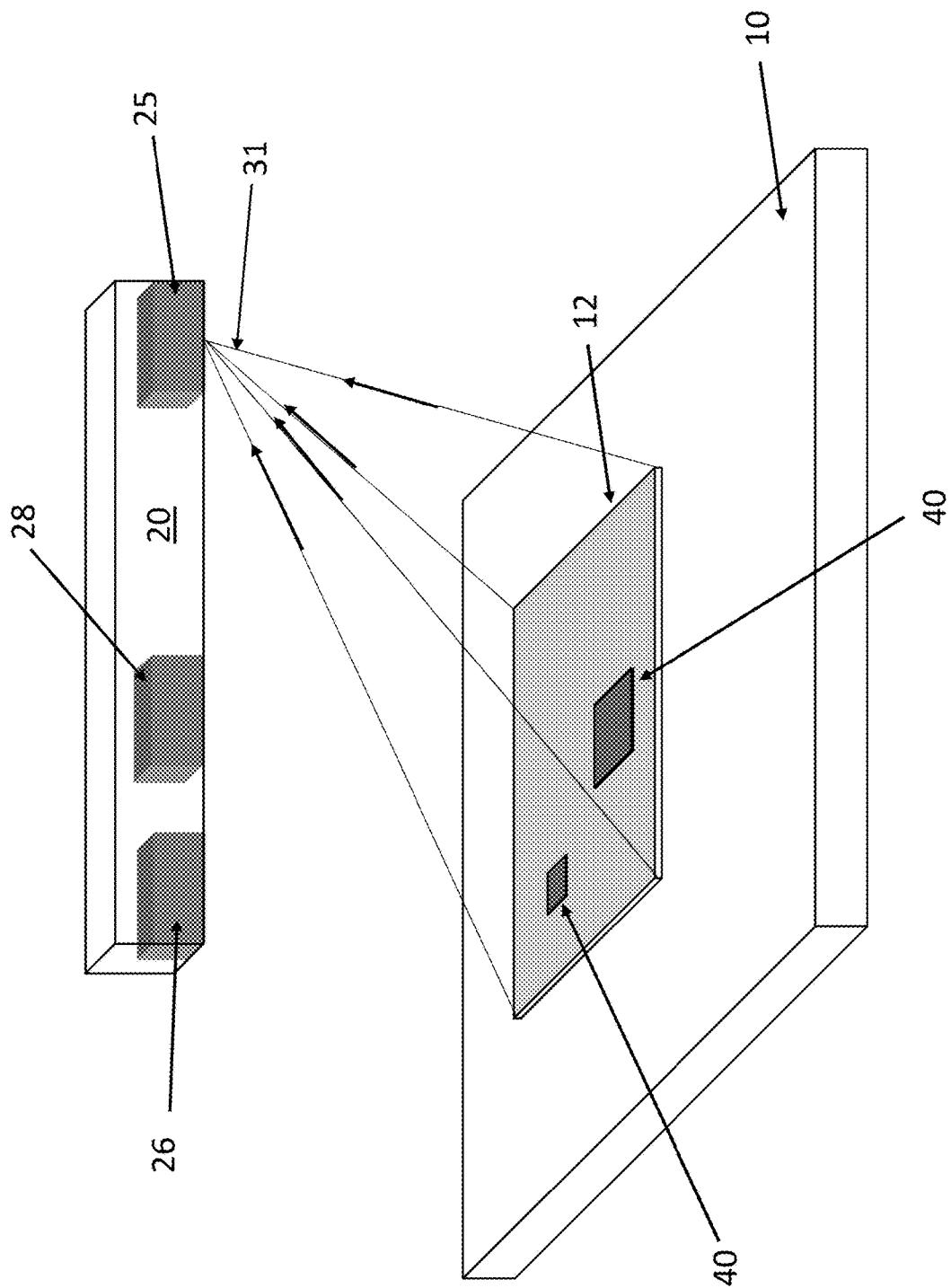
FIG. 3A schematically shows the detection of a candidate rock in a target region using a device present on an aircraft in accordance with illustrative embodiments.

FIG. 3A schematically shows the detection of a candidate rock in a target region using a device present on an aircraft in accordance with illustrative embodiments. FIG. 3A schematically shows one technique to detect a specific mineral of interest, which can be any mineral or metal that may be present in the target regions 12, such as chrysoberyl, quartz, beryl, garnet, moonstone, apatite, diamond, spinel, tanzanite, tourmaline, topaz, and zircon, using exemplary modality for performing this technique—using an overhead device, such as a plane 20. Indeed, overhead modalities may include any of a wide variety of conventional devices, such as the airplane 20 (as shown in the figure), and this airplane 20 can be piloted or a drone. Other examples include hand-held devices, balloons, gliders, helicopters, autogyros, airships, or blimps. Various embodiments are not limited to flying devices. For example, some embodiments may implement this modality using a handheld device operated by a user on the ground. Other embodiments envision underwater or waterproof devices to interrogate underwater surface segments 12 (not shown). For example, a diver holding a handheld device may interrogate underwater surface or soil. Alternatively, the modality may be part of a boat or submersible, such as a manned or unmanned submarine.

The technique can utilize an imagining device, such as a camera 25, including an image sensor and lens, capable of observing (e.g., capturing an image of) light 31 from a target region 12 of the land 10. Subsequently, a processor (not shown in FIG. 3A) coupled to the camera 25 conducts image processing on the image data captured by the camera 25 to identify rock formations 40 in the target region that are likely to contain or be indications or a mineral or metal of interest. For example, gold, a metal, is most commonly found in quartz, an oxide mineral of silicone. The image from the camera 25 can be processed using any number of techniques which are nor discussed herein, but are easily understood by one skilled in the art, such as by pattern, color, albedo, texture, shape, etc. Once a rock formation 40 have been detected and located in the image, FIGS. 3B and 3C illustrate the subsequent steps of testing a specific candidate rock formation 40' for a positive detection of its mineral or element content.

Figure 3B:
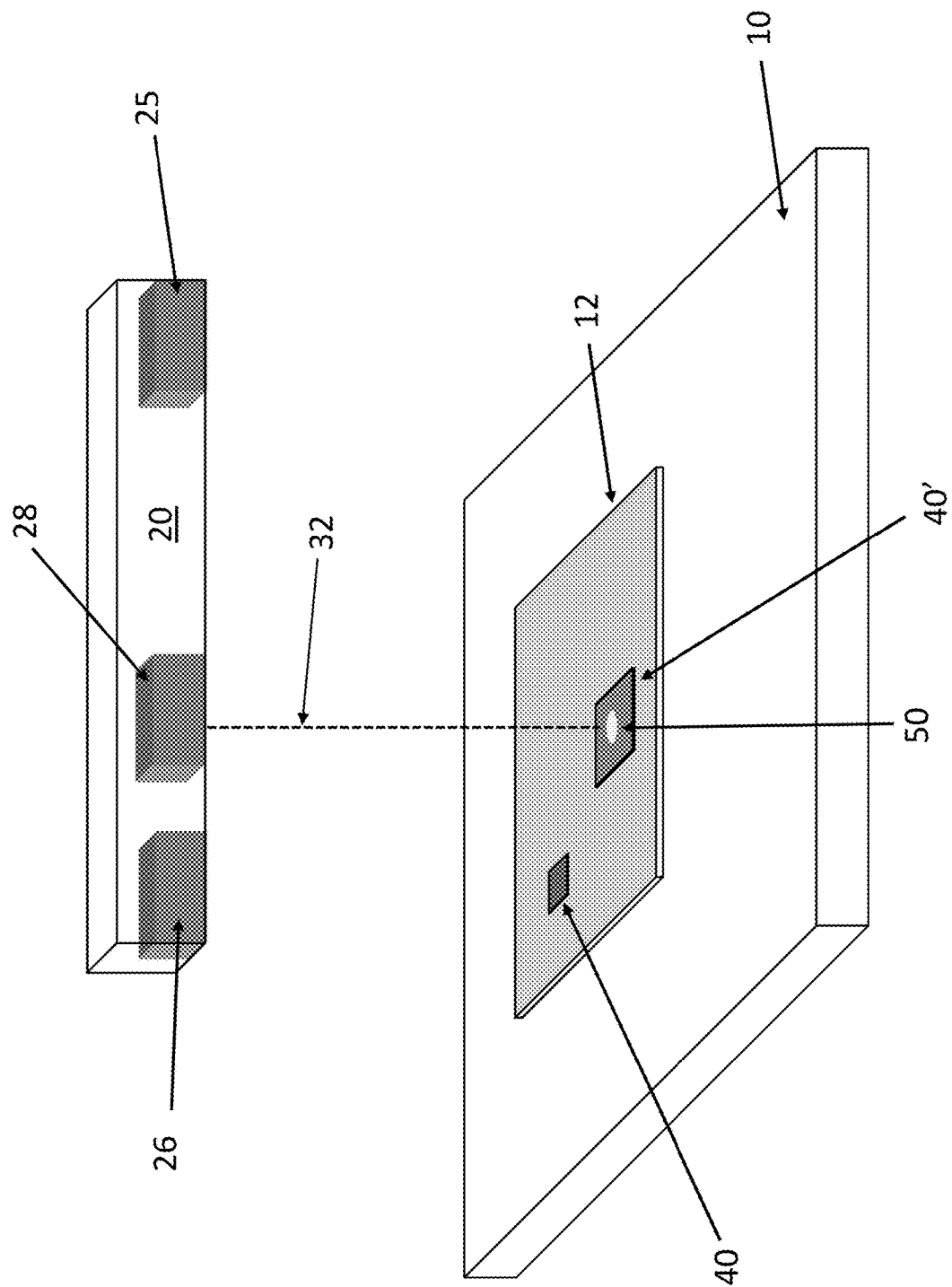
FIG. 3B schematically shows the detection of transmission of electromagnetic radiation to the candidate rock using a device present on an aircraft in accordance with illustrative embodiments.
Figure 3C:
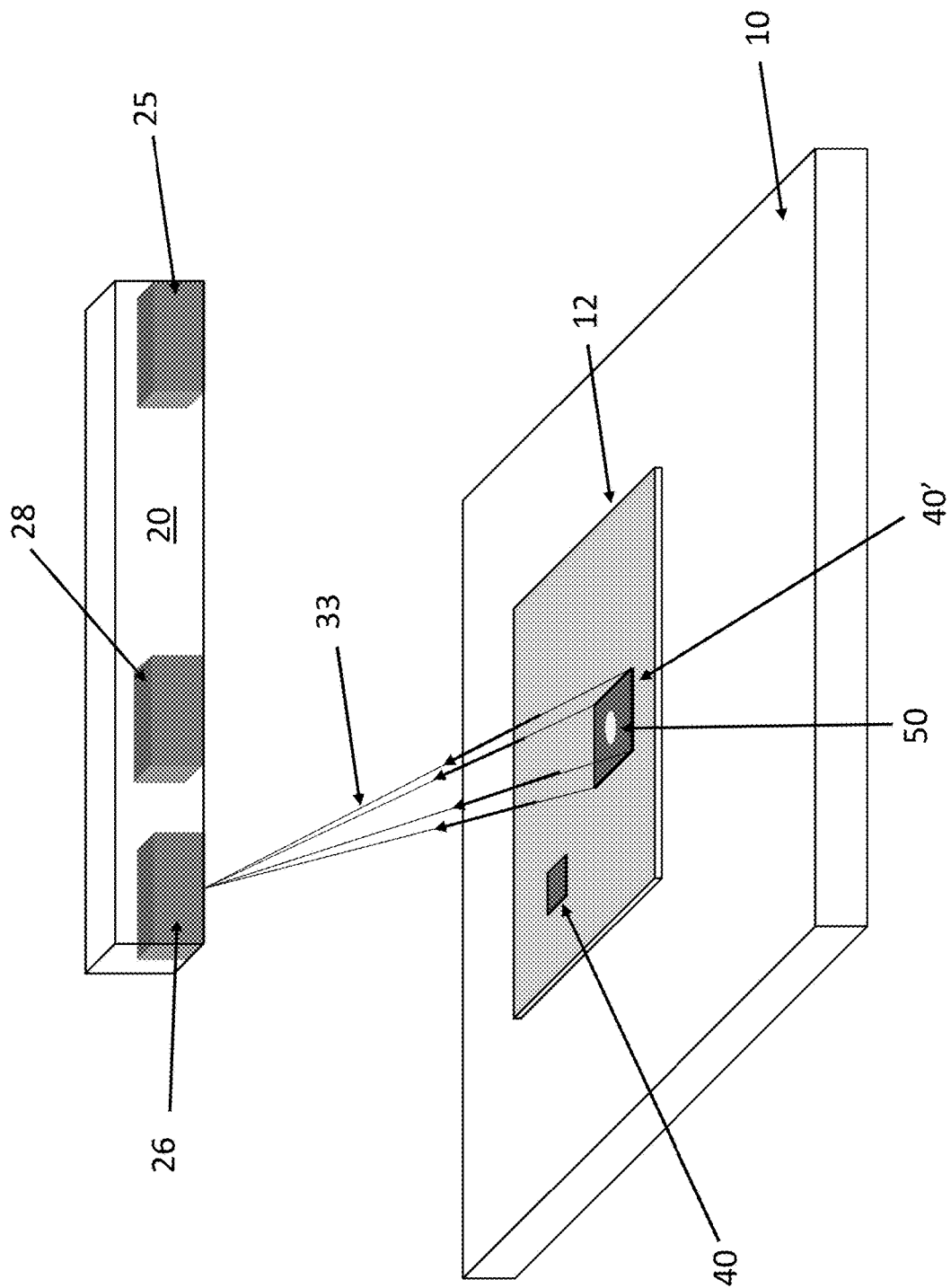
FIG. 3C schematically shows the detection of a light signature generated by the electromagnetic radiation applied to the candidate rock of FIG. 3B using a device present on an aircraft in accordance with illustrative embodiments.

FIG. 3B schematically shows the detection of transmission of electromagnetic radiation to the candidate rock using a device present on an aircraft in accordance with illustrative embodiments. The first steps in this example testing technique utilizes an energy device 28, also onboard the aircraft 20, capable of directing electromagnetic radiation 32 toward at least a portion of a target region 12 to be absorbed by a portion of the candidate rock formation 40 detected in the target region 12. As discussed below, the technique analyzes the spectral signature of a light signature 32 received from the candidate rock formation 40' to detect trace amounts of the mineral or metal in the candidate rock formation 40'.

In one example, the energy device 28 is configured to direct light 32 from the plane 20 (or, in other examples, a handheld device) toward the candidate rock formation 40' identified by the camera 25 that causes the candidate rock formation 40' to be illuminated with light of one or more frequencies corresponding to the absorption frequencies of one or more minerals or metals to be detected in the candidate rock formation 40'. In illustrative embodiments, this candidate rock formation 40' then reflects and/or emits a light signature 50 in response to the receive light 32, whereby the light signature 50 from the candidate rock formation 40' contains a spectral signature indicative of any absorption or emission of the received light 32 by minerals in the candidate rock formation 40' that absorb the received light 32. The energy device 28 (e.g., a light source) may generate electromagnetic energy in a variety of way, such as via a LED or laser.

In another example, the energy device 28 is configured to direct high-energy focused electromagnetic radiation (e.g., from a laser or microwave emitter) to the candidate rock formation 40' that causes at least a portion of the candidate rock formation 40' to burn or vaporize (e.g., form a plasma), whereby the burning or vaporizing of the candidate rock formation 40' generates the light signature 50 that can have, for example, one or more spectral features indicative of the minerals contained in the portion of the candidate rock formation 40' that was burned or vaporized.

In either case, and as illustrated in FIG. 3C, once a light signature 50 is generated, another device, such as a spectrometer 26, carried by the aircraft 20 can be configured to receive and analyze the light signature 50 of the candidate rock formation 40'.

FIG. 3C schematically shows the detection of a light signature generated by the electromagnetic radiation applied to the candidate rock of FIG. 3B using a spectrometer device 26 present on an aircraft in accordance with illustrative embodiments. As known by those in the art, the spectral signature is a measurement of the intensity of light over a specific portion of the electromagnetic spectrum. In some examples, the measured portion of the electromagnetic spectrum ranges from about 320 nm to about 1000 nm in wavelength. Among other things, this spectral signature may be read using an optical spectrometer, spectrophotometer, spectrograph, spectroscope, or other spectrally sensitive optical measurement device known by those skilled in the art. FIG. 3C shows a spectrometer device 26 capturing an image or otherwise receiving light 33 of the candidate rock formation 40', which includes the light signature 50. To detect the presence or absence of a mineral in the candidate rock formation 40', illustrative embodiments compare the spectral signature of the light signature 50 received by the spectrometer device 26 to the known spectral signature of one or more of a plurality of different minerals. For example, some embodiments may compare the spectral signature of the received light against spectral signatures of emerald and diamond to determine if an emerald or diamond vein 16 is beneath the target region 12. A match between the detected spectral signature of the light signature 50 and the known spectral signature indicates the presence of the mineral or metal of interest in the candidate rock formation 40' and is evidence of a geological mineral vein 16 containing the mineral or metal of interest lying underneath or near the segment 12. This process may then be repeated on other rock formations 40 in the segment 12 to map out the approximate location/area of an underground geological mineral vein 16 below the segment 12 that contains the mineral or metal of interest. Further, multiple segments 12 can be observed (and any detected rock formations 40 therein can be tested) to map a larger area of the land 10.

Figure 4A:
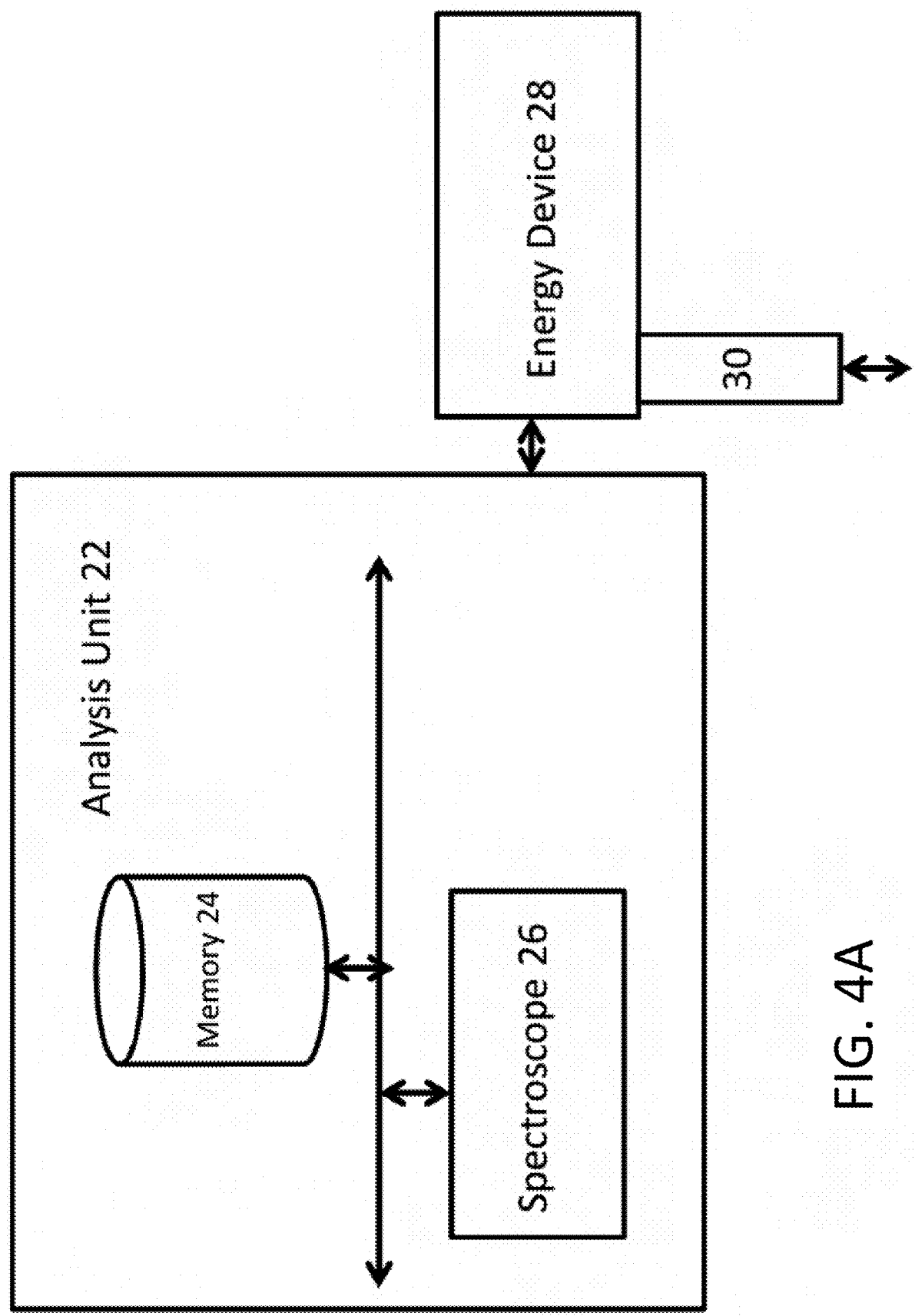
FIG. 4A schematically shows details of a testing apparatus for detecting the presence of a mineral or metal in accordance with illustrative embodiments of the invention.
Figure 4B:
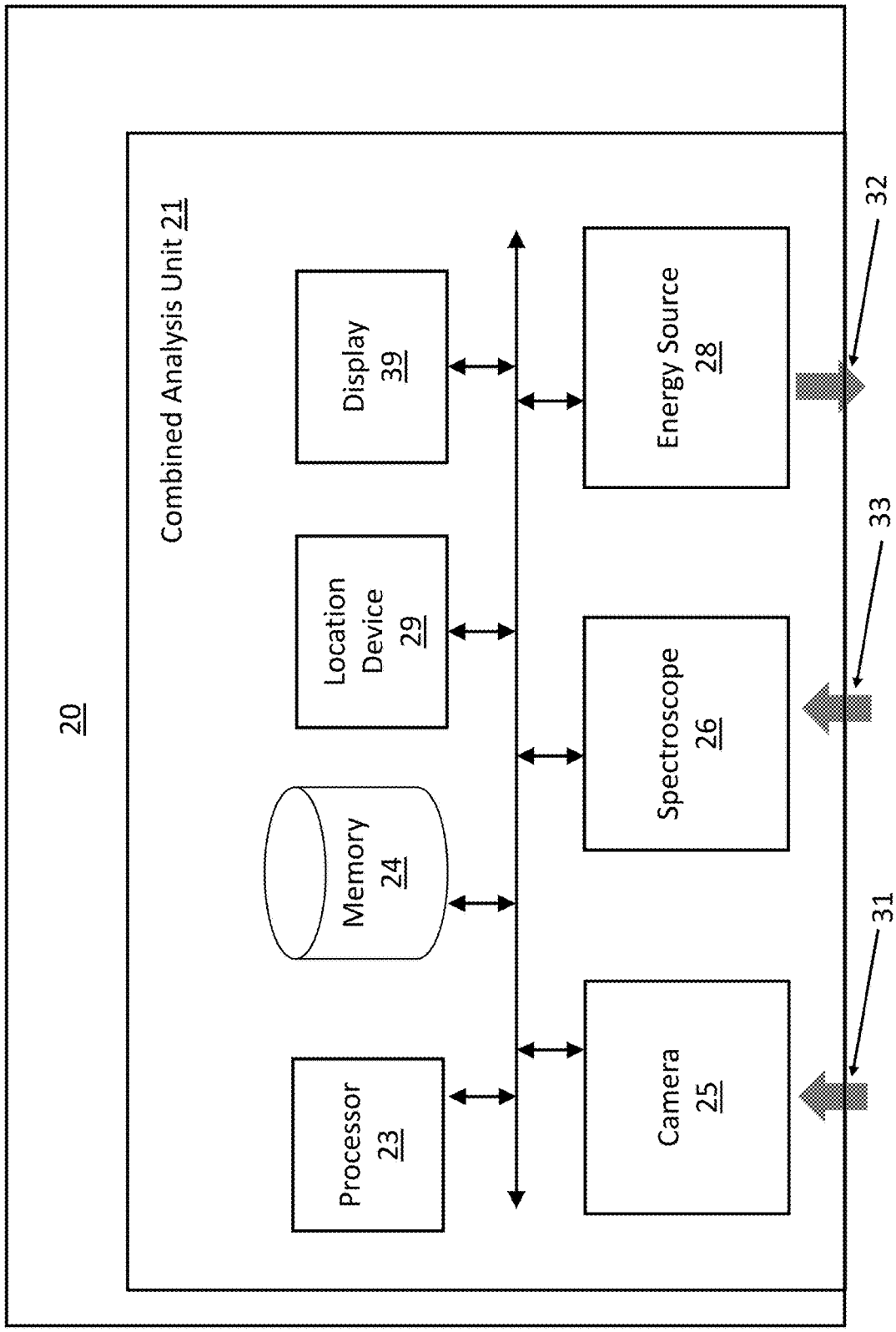
FIG. 4B schematically shows details of a combined system for locating and detecting the presence of a mineral or metal in accordance with illustrative embodiments of the invention.
Figure 4C:
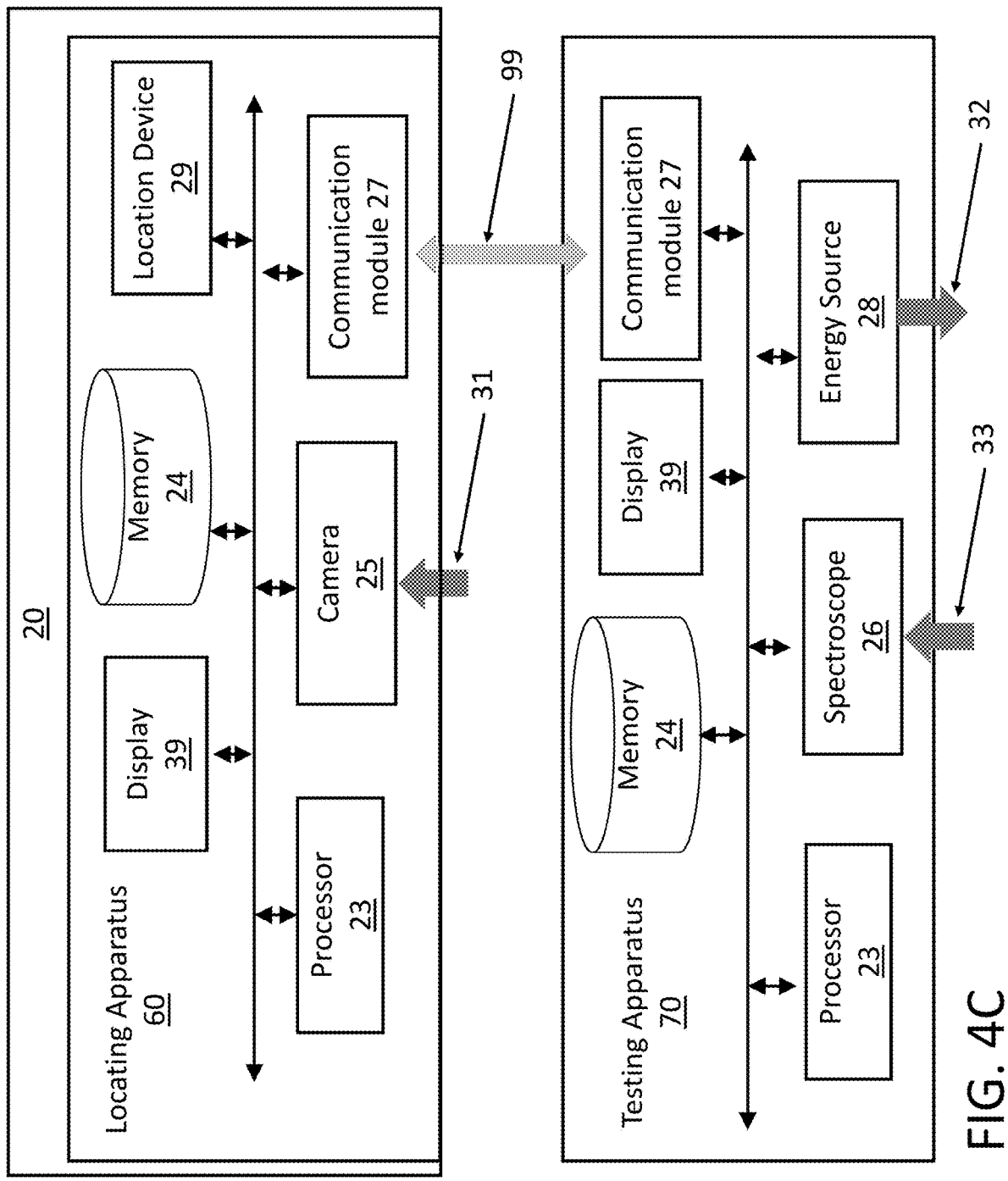
FIG. 4C schematically shows details of a two-part system for locating and detecting the presence of a mineral or metal in accordance with illustrative embodiments of the invention.

FIGS. 4A-4C schematically shows details of apparatuses for locating and detecting the presence of a mineral or metal in accordance with illustrative embodiments of the invention. Each of the components of this figure is operatively connected by any conventional interconnect mechanism. FIGS. 4A-4C simply show a bus communicating each the components. Those skilled in the art should understand that this generalized representation can be modified to include other conventional direct or indirect connections. Accordingly, discussion of a bus is not intended to limit various embodiments.

Indeed, it should be noted that FIGS. 4A-4C only schematically shows each of these components. Those skilled in the art should understand that each of these components can be implemented in a variety of conventional manners, such as by using hardware, software, or a combination of hardware and software, across one or more other functional components. For example, the spectrometer may be implemented using a plurality of microprocessors executing firmware. As another example, the spectrometer may be implemented using one or more application specific integrated circuits (i.e., "ASICs") and related software, or a combination of ASICs, discrete electronic components (e.g., transistors), and microprocessors. Accordingly, for example, the representation of the spectrometer and other components in a single box of FIG. 4 is for simplicity purposes only. In fact, in some embodiments, the spectrometer of FIG. 4 is distributed across a plurality of different machines—not necessarily within the same housing or chassis.

It should be reiterated that the representation of FIGS. 4A-4C are a significantly simplified representation. Those skilled in the art should understand that such a device may have many other physical and functional components, such as central processing units, other data processing modules, and short-term memory. Accordingly, this discussion is in no way intended to suggest that FIGS. 4A-4C represents all of the elements of a system for detecting a mineral or metal.

As shown in FIG. 4A, the basic testing system includes an analysis unit 22 having memory 24 operatively coupled with a spectroscope 26. Those skilled in the art may select an appropriate type of spectroscope 26 for the task at hand. The memory 24 may store sample data for spectral signatures of various metals and minerals, and output data from the processes described herein. The analysis unit 22 can be operatively coupled with an energy device 28 having an output 30 for directing light 31 toward a target region 12 and receiving a signal 32 representative of the light signature of a target region 12.

FIG. 4B schematically shows details of a combined system for locating and detecting the presence of a mineral or metal in accordance with illustrative embodiments of the invention. FIG. 4B shows a combined analysis unit 21 that could be, for example, carried by an aircraft 20 or other vehicle, or, in other instances, by a human operator on the ground. The combined analysis unit 21 includes a camera 25 configured to capture images 31 of a target region 12 along with a processor 23 and memory 24 for carrying out the various operations of the combined analysis unit 21, including image processing data from the camera 25 to detect candidate rocks 40 or plants, as discussed in more detail below. The combined analysis unit 21 also includes a spectroscope 26 and a source of directed electromagnetic radiation 28, where the source of directed electromagnetic radiation 28 is capable of directing electromagnet energy 32 towards a rock or plant identified in the target region by the camera 25 and the spectroscope 26 is capable of receiving and analyzing light 33 from the target region 12, including a light signature 50 from the rock or plant receiving the directed electromagnetic radiation 32. In some instances, the combined analysis unit 21 includes a location device 29 for determining a location of the combined analysis unit 21 as well determining a location in the image 31 of the candidate rock or plant. The combined analysis unit 21 can include a display 39 for aiding an operator of the combined analysis unit 21 to conduct the locating and testing steps of the process, as well as for displaying the resultant detection data and, for example, a map of the target region 12 or land 10 including any detections of determined veins 16 or boundaries between mineral deposits. The memory 24 can include a database of patterns or detection features for aiding the image processing detection for locating candidate rocks and plants, as well a database of spectral features for aiding the analysis of the light signature 50 from the candidate rocks or plants.

FIG. 4C schematically shows details of a two-part system for locating and detecting the presence of a mineral or metal in accordance with illustrative embodiments of the invention. FIG. 4B shows a locating apparatus 60 that could be, for example, carried by an aircraft 20 or other vehicle, or, in other instances, by a human operator on the ground, and a testing apparatus 70 configured to receive a location of a detected rock or plant and carryout the testing of the candidate rock or plant using directed electromagnetic radiation. The locating apparatus 60 includes a camera 25 configured to capture images 31 of a target region 12 along with a processor 23 and memory 24 for carrying out the various operations of the combined analysis unit 21, including image processing data from the camera 25 to detect candidate rocks 40 or plants, as discussed in more detail below. The testing apparatus 70 can include a spectroscope 26 and a source of directed electromagnetic radiation 28, where the source of directed electromagnetic radiation 28 is capable of directing electromagnet energy 32 towards a rock or plant identified in the target region by the camera 25 and the spectroscope 26 is capable of receiving and analyzing light 33 from the target region 12, including a light signature 50 from the rock or plant receiving the directed electromagnetic radiation 32. In some instances, the locating apparatus 60 includes a location device 29 for determining a location of the locating apparatus 60 as well determining a location in the image 31 of the candidate rock or plant. Either of the locating apparatus 60 and the testing apparatus 70 can include a display 39 for aiding an operator of either of the locating apparatus 60 and the testing apparatus 70 to conduct the locating and testing steps of the process, as well as for displaying the resultant detection data and, for example, a map of the target region 12 or land 10 including any detections of determined veins 16 or boundaries between mineral deposits. Both of the locating apparatus 60 and the testing apparatus 70 can include a communication module 27 for conducting wired or wireless communication 99 between the locating apparatus 60 and the testing apparatus 70 to enable, for example, the locating apparatus 60 to provide to the testing apparatus a location of a detecting rock or plant for testing.

Figure 5:
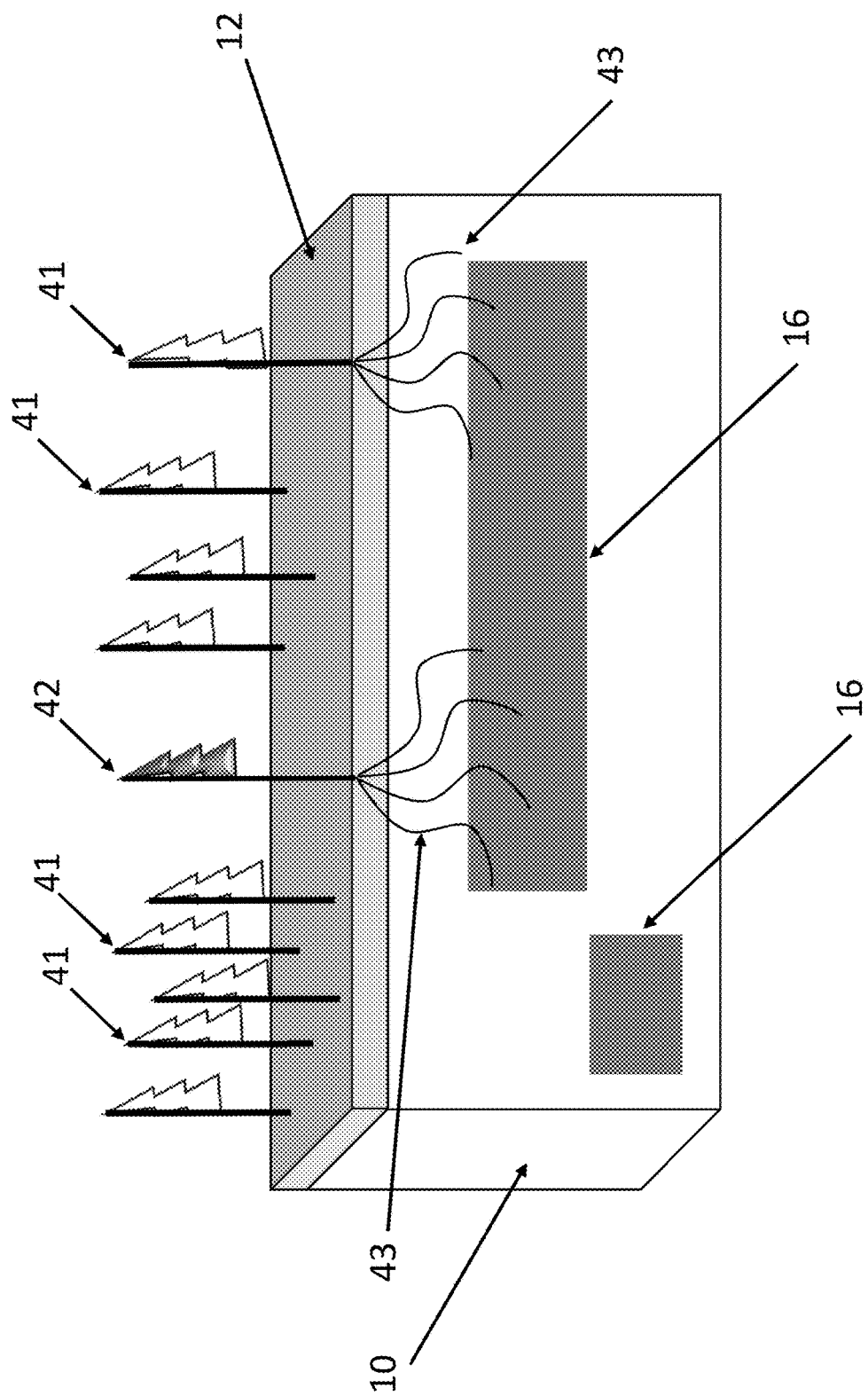
FIG. 5 schematically shows an exemplary cross-section of a target region containing plants above a geological mineral vein.

FIG. 5 schematically shows an exemplary cross-section of a target region 12 containing plants 41 above a geological mineral vein 16. In FIG. 5, the roots 43 of the plants 41 are shown to interact with the mineral vein 16 underground. In doing so, some of the plants 41 may be able to accumulate a detectable amount of any minerals present in the vein 16 in their structure (e.g., leaves, roots, trunks), and these plants are known as superaccumulator or hyperaccumulator plants 42. Such hyperaccumulator plants 42 may be able to, for example, absorb a significant quantity of silver, cobalt, iron, copper, cadmium, lead, mercury, selenium, manganese, zinc, molybdenum or nickel from the ground in comparison to ordinary plants. In some instances, this ratio is 100 or even 1000 times more accumulation for a similar exposure. Accordingly, such or hyperaccumulator plants 42 can be specifically detected and subsequently tested, according to examples of the present disclosure, for a mineral or metal that they are known to be able to accumulate. A positive detection of a mineral or metal in a hyperaccumulator plants 42 is evidence of the presence of that mineral or metal in the target region 12.

Figure 6A:
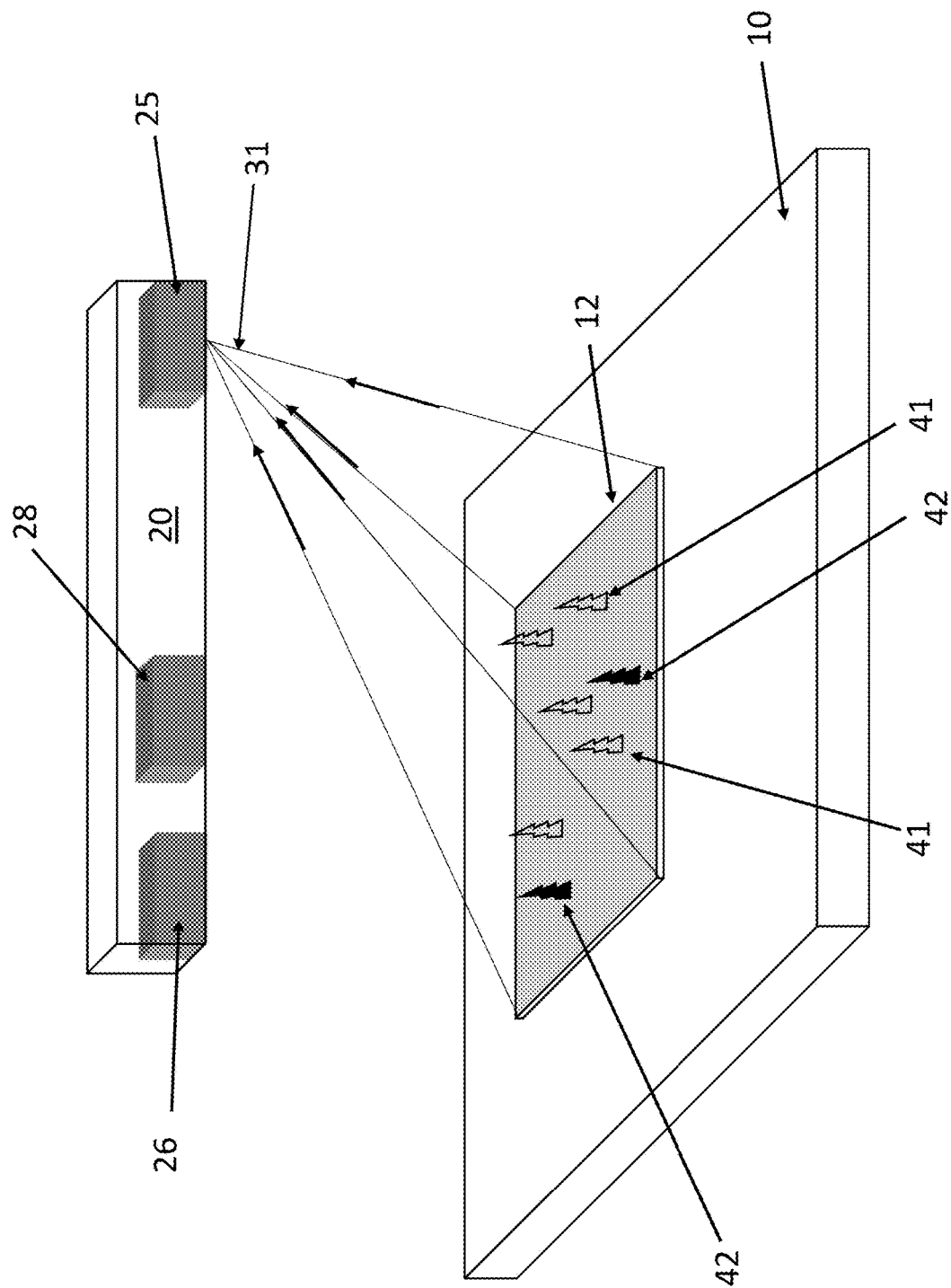
FIG. 6A schematically shows the locating of a specific plant of interest in a target region using a device present on an aircraft in accordance with illustrative embodiments.

FIG. 6A schematically shows the locating of a specific plant of interest in a target region using a device present on an aircraft in accordance with illustrative embodiments. FIG. 6A schematically shows one technique to detect a specific mineral of interest, which can be any mineral or metal that may be present in the target regions 12, by locating and testing plant material using exemplary modality for performing this technique—using an overhead device, such as a plane 20. Indeed, overhead modalities may include any of a wide variety of conventional devices, such as the airplane 20 (as shown in the figure), and this airplane 20 can be piloted or a drone. Other examples include hand-held devices, balloons, gliders, helicopters, autogyros, airships, or blimps. Various embodiments are not limited to flying devices. For example, some embodiments may implement this modality using a handheld device operated by a user on the ground. Other embodiments envision underwater or waterproof devices to interrogate underwater surface segments 12 (not shown). For example, a diver holding a handheld device may interrogate underwater surface or soil. Alternatively, the modality may be part of a boat or submersible, such as a manned or unmanned submarine.

The technique can utilize an imagining device, such as a camera 25, including an image sensor and lens, capable of observing (e.g., capturing an image of) light 31 from a target region 12 of the land 10. Subsequently, a processor (not shown in FIG. 6A) coupled to the camera 25 conducts image processing on the image data captured by the camera 25 to identify hyperaccumulator plants 42, in the target region that are likely to contain or be indications or a mineral or metal of interest. For example, water hyacinth, an aquatic plant native to the Amazon basin, is a known hyperaccumulator of Chromium. The image from the camera 25 can be processed using any number of techniques which are nor discussed herein, but are easily understood by one skilled in the art, such as by pattern, color, albedo, texture, shape, etc. Once a hyperaccumulator 42 has been detected and located in the image, FIGS. 6B and 6C illustrate the subsequent steps of testing a specific candidate plant 42' for a positive detection of its mineral or element content.

Figure 6B:
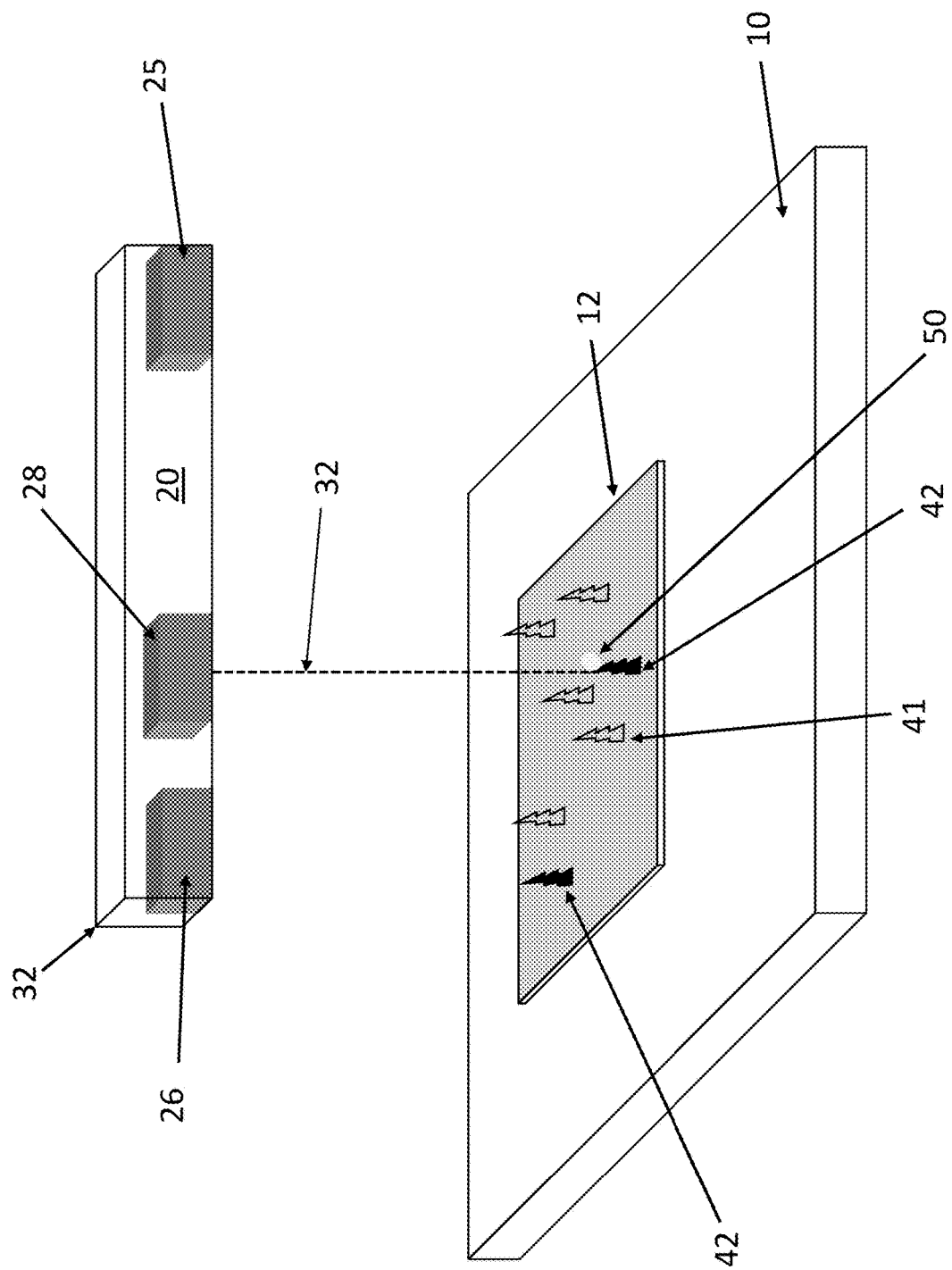
FIG. 6B schematically shows the transmission of electromagnetic radiation from the device of FIG. 6A to the specific plant of interest.

FIG. 6B schematically shows the transmission of electromagnetic radiation from the device of FIG. 6A to the specific plant of interest. The first steps in this example testing technique utilizes an energy device 28, also onboard the aircraft 20, capable of directing electromagnetic radiation 32 toward a candidate plant 42' detected in the target region 12. As discussed below, the technique analyzes the spectral signature of a light signature 32 received from the candidate plant 42' to detect trace amounts of the mineral or metal in the candidate plant 42'.

In one example, the energy device 28 is configured to direct high-energy focused electromagnetic radiation (e.g., from a laser or microwave emitter) to the candidate plant 42' that causes at least a portion of the candidate plant 42' to burn or vaporize (e.g., form a plasma), whereby the burning or vaporizing of the candidate plant 42' generates the light signature 50 that can have, for example, one or more spectral features indicative of the minerals contained in the portion of the candidate plant 42' that was burned or vaporized.

Figure 6C:
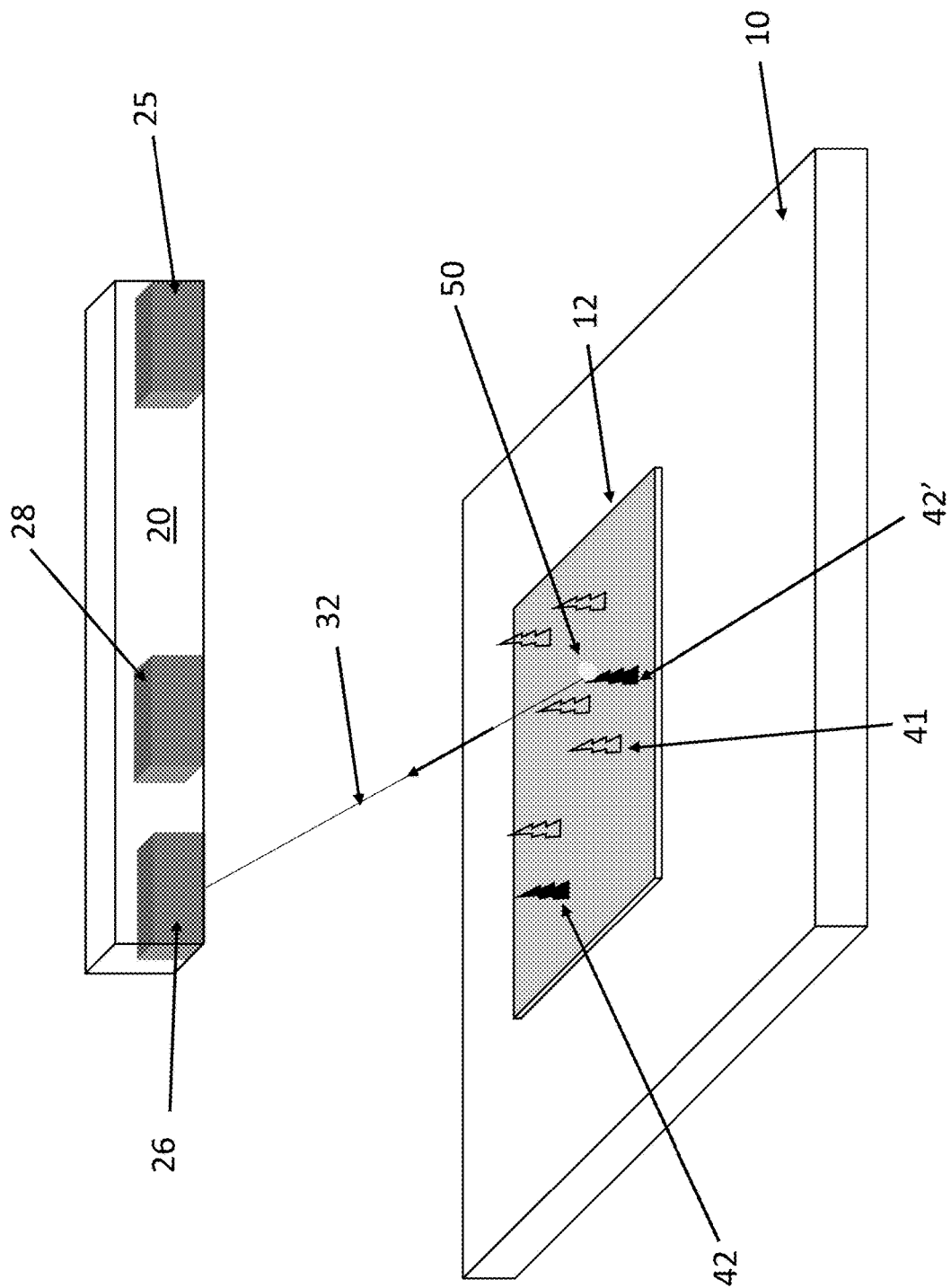
FIG. 6C schematically shows the detection of a specific metal or mineral of interest in a target region using the device of FIG. 6A to detect a light signature emitted from the specific plant of interest in response to the electromagnetic radiation.

In either case, and as illustrated in FIG. 6C, once a light signature 50 is generated, another device, such as a spectrometer 26, carried by the aircraft 20 can be configured to receive and analyze the light signature 50 of the candidate plant 42'.

FIG. 6C schematically shows the detection of a specific metal or mineral of interest in a target region using the device of FIG. 6A to detect a light signature emitted from the specific plant of interest in response to the electromagnetic radiation. As known by those in the art, the spectral signature is a measurement of the intensity of light over a specific portion of the electromagnetic spectrum. In some examples, the measured portion of the electromagnetic spectrum ranges from about 320 nm to about 1000 nm in wavelength. Among other things, this spectral signature may be read using an optical spectrometer, spectrophotometer, spectrograph, spectroscope, or other spectrally sensitive optical measurement device known by those skilled in the art. FIG. 6C shows a spectrometer device 26 capturing an image or otherwise receiving light 33 of the candidate plant 42', which includes the light signature 50. To detect the presence or absence of a mineral in the candidate plant 42', illustrative embodiments compare the spectral signature of the light signature 50 received by the spectrometer device 26 to the known spectral signature of one or more of a plurality of different minerals. For example, some embodiments may compare the spectral signature of the received light against spectral signatures of emerald and diamond to determine if Chromium is beneath the target region 12. A match between the detected spectral signature of the light signature 50 and the known spectral signature indicates the presence of the mineral or metal of interest in the candidate plant 42' and is evidence of a geological mineral vein 16 containing the mineral or metal of interest lying underneath or near the segment 12. This process may then be repeated on hyperaccumulators 42 in the segment 12 to map out the approximate location/area of an underground geological mineral vein 16 below the segment 12 that contains the mineral or metal of interest. Further, multiple segments 12 can be observed (and any detected hyperaccumulators 42 therein can be tested) to map a larger area of the land 10.

Figure 7A:
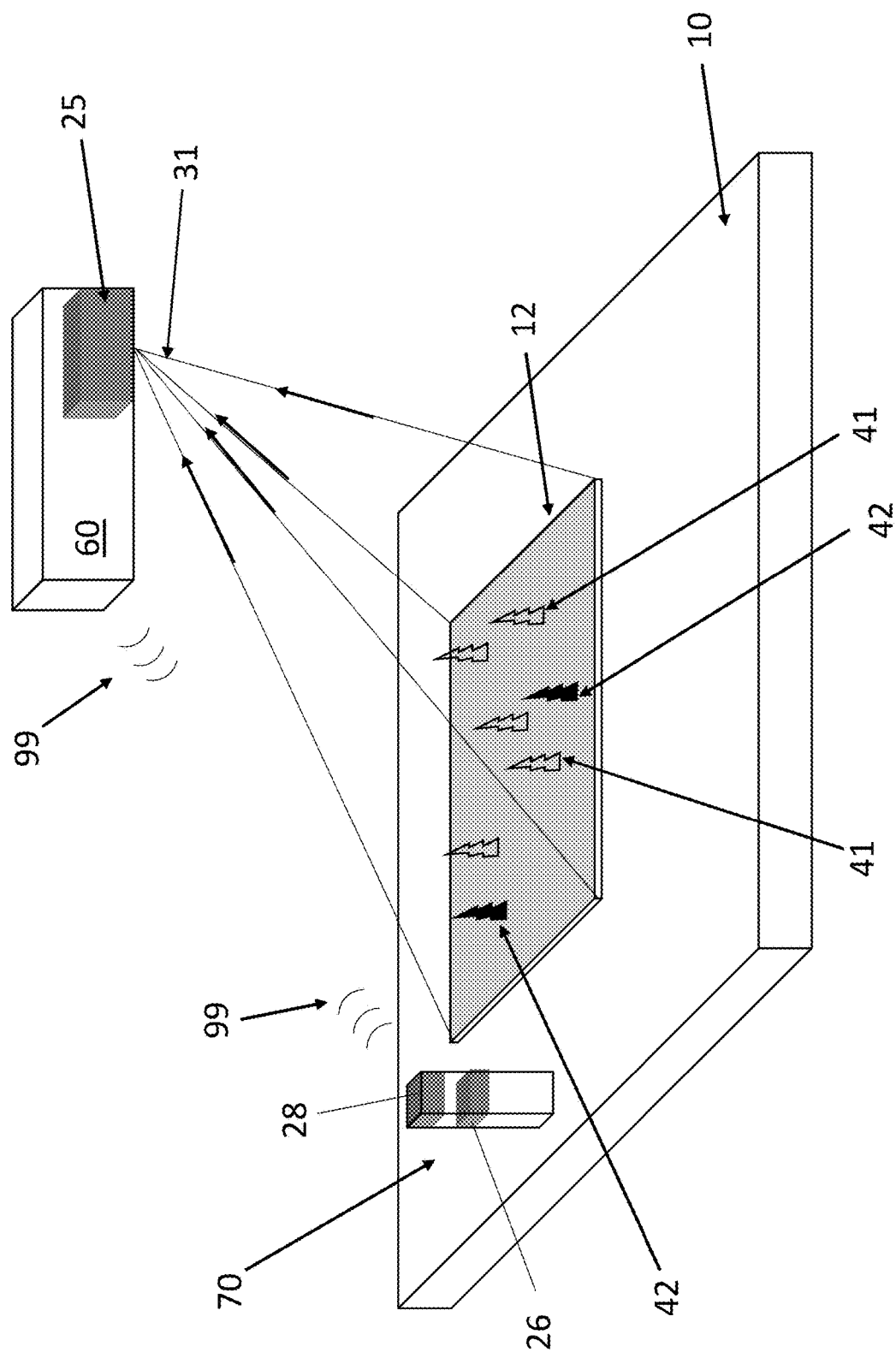
FIG. 7A schematically shows the locating of a specific plant of interest in a target region using a locating apparatus present on an aircraft in accordance with illustrative embodiments.

FIG. 7A schematically shows the locating of a specific plant of interest in a target region using a locating apparatus present on an aircraft in accordance with illustrative embodiments. In FIG. 7A, a locating apparatus 60 is present onboard, for example, an aircraft or other vehicle, along with a camera 25 for capturing images of the target region 12 for detecting the present of hyperaccumulator plants 42 among the other plants 41 present. The locating apparatus 60 is in wireless communication 99 with a testing apparatus 70 present on or near the ground 10, for example, with a user present in the target region 12. Accordingly, and as detailed above, the locating apparatus 60 includes a energy device 28 and a spectrum testing device, such as a spectrophotometer 26.

Figure 7B:
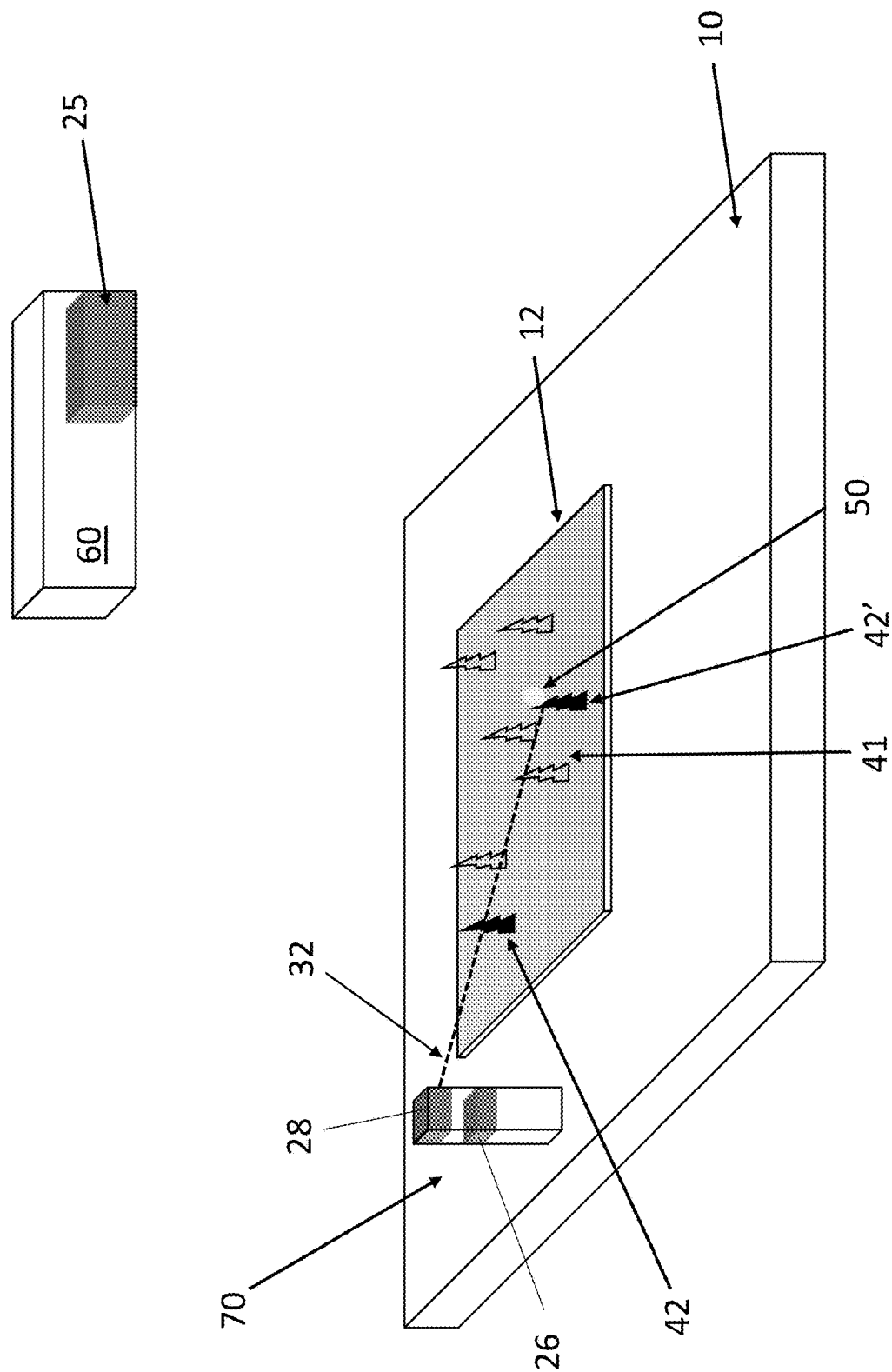
FIG. 7B schematically shows the transmission of electromagnetic radiation to the specific plant of interest from a ground-based device after receiving the location from the locating apparatus of FIG. 7A.
Figure 7C:
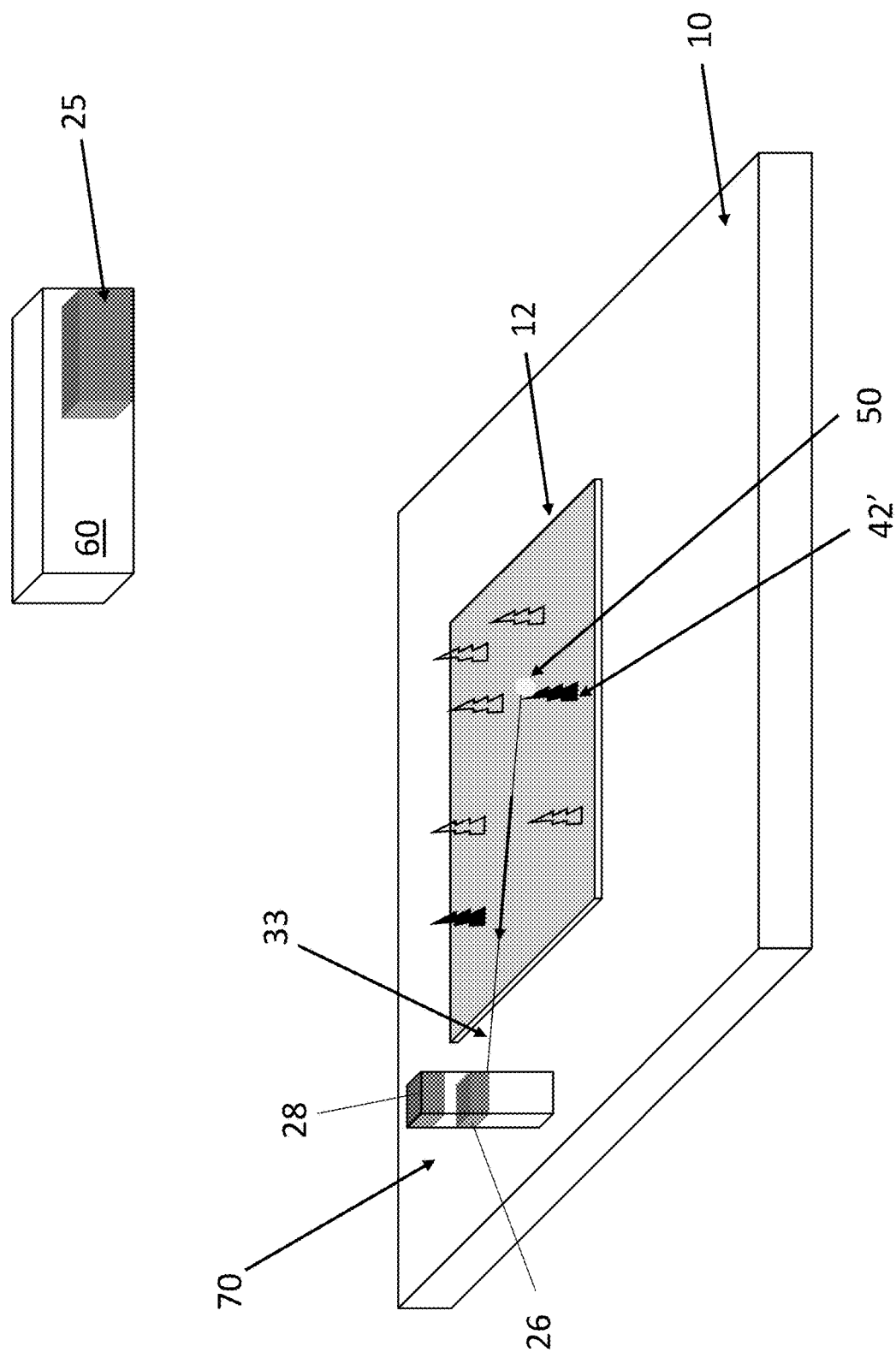
FIG. 7C schematically shows the detection of a specific metal or mineral of interest in a target region using the ground-based device of FIG. 7B to detect a light signature emitted from the specific plant of interest in response to the electromagnetic radiation.

FIG. 7B schematically shows the transmission of electromagnetic radiation to the candidate plant 42, of interest from a ground-based testing apparatus 70 after receiving the location of the candidate plant 42 from a locating apparatus 60 of FIG. 7A. In FIG. 7B, once the testing apparatus 60 has received the location of a candidate plant 42', or otherwise when a user of the testing apparatus 70 has confirmed the location, the energy source 28 of the testing apparatus 70 directs electromagnetic radiation 32 to the candidate plant 42' to cause a light signature 50 to be created, as discussed herein. Afterwards, and as shown in FIG. 7C, the spectrophotometer 26 of the testing device receives light 33 from the candidate plant 42', including the light signature 50. FIG. 7C schematically shows the detection of a specific metal or mineral of interest in a target region 12 using the ground-based testing apparatus 70 of FIG. 7B to detect a light signature 50 emitted from the specific candidate plant 42' of interest in response to the electromagnetic radiation 32.

Figure 8:
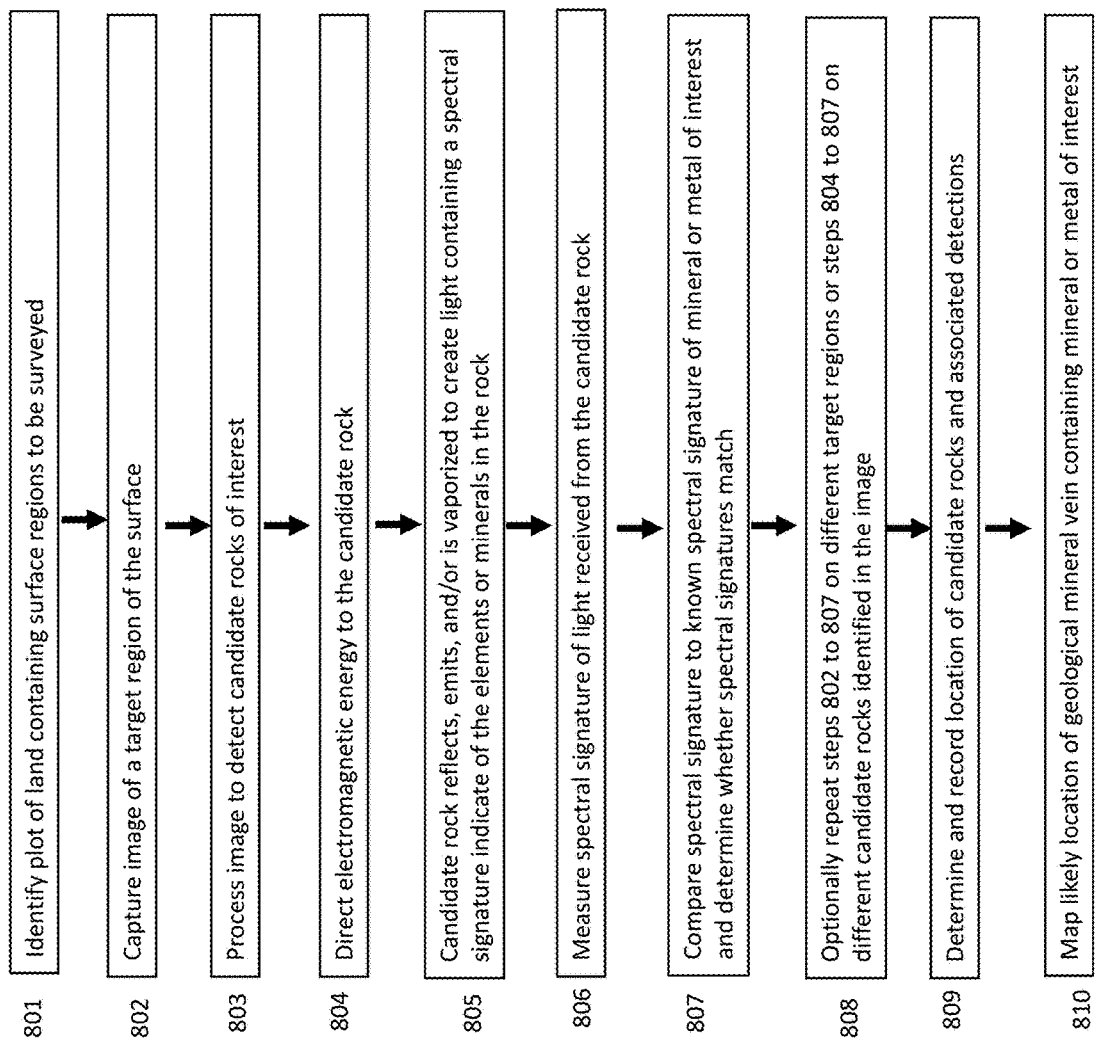
FIG. 8 shows a process of mapping geological mineral or element veins by locating and testing candidate rocks in accordance with illustrative embodiments.

FIG. 8 shows a process of mapping geological mineral or element veins 16 by locating and testing candidate rocks 40' in accordance with illustrative embodiments. It should be noted that this process is substantially simplified from a longer process that normally may be used to locate the mineral vein 16. Accordingly, the process of locating the mineral vein 16 may have many steps, such as follow-up testing steps or extraction steps, which those skilled in the art may use. In addition, some of the steps may be performed in a different order than that shown, or at the same time. Those skilled in the art therefore can modify the process as appropriate. Moreover, as noted above and below, many of the devices and structures noted are but one of a wide variety of different devices and structures that may be used. Those skilled in the art can select the appropriate devices and structures depending upon the application and other constraints. Accordingly, discussion of specific devices and structures is not intended to limit all embodiments.

The method begins at step 801, which identifies a plot of land 10 for surveying. The plot of land 10 ideally has sufficient ground exposure (e.g., lack of dense foliage) such that more than one target regions 12 on the land can be interrogated. Next, at step 802, a camera captures an image of the target region of the surface. At step 803, the image is processed to detect rocks 40 or rock formations of interest that are identified as being able to be detected to make a determination of their mineral content. At step 804, a device directs electromagnetic energy toward a candidate rock formation 40' in the target region 12 on the plot of land 10. This energy source may be any energy source capable of causing minerals or metals exposed at the surface to reflect, scatter, burn, vaporize, or otherwise emit light in response to the received electromagnetic energy (e.g., from a laser, LED, or microwave emitter). Depending on any sunlight incident on the target region, one skilled in the art will appreciate that the amount of electromagnetic energy used should be sufficiently illuminate the target region 12 such that any light signature from the emitted light is distinguished from the light signature from the sunlight or other ambient light, which is dependent on the sensitivity of the device used to analyze the light signature (e.g., a spectrophotometer). Some embodiments therefore may vary in their specific use and operating conditions (e.g., time of day, distance to ground, length of exposure), depending on the instrumentation used, the strength of the illumination, and the quality of the illumination (e.g., broadband vs. narrow band), and the type of light signature being detected (e.g., reflective vs. emissive).

In step 805, when the electromagnetic radiation (e.g., light) is directed toward the candidate rock formation 40', at least a portion of the candidate rock formation 40' absorbs one or more specific frequencies of the light and generates a light signature 50 according to one or more of many different processes depending on the frequency and strength of the electromagnetic radiation. According, at step 806, a spectral measurement device absorbs and then measures the spectrum of the emitted light signature 50 at step 805. In some examples, the minerals in the candidate rock formation 40' also emit light at specific frequencies in response to the absorbed light due to, for example, fluorescence. Among other things, as noted above, the spectral device may include an optical spectrometer, spectrophotometer, spectrograph, or, a spectroscope. The spectral signature of the emitted light is anticipated to read from about 320 nm to about 1000 nm, although other ranges may be used. Step 806 then compares the measured spectral signature (e.g., light signature) to the known spectral signature of one or more minerals of interest, such as chrysoberyl, quartz, beryl, garnet, moonstone, apatite, diamond, spinel, tanzanite, tourmaline, topaz, and zircon. In some examples, the minerals include organics such as those found in bones or fossils. Step 807 then determines whether the spectral signatures match a known spectral signature of a mineral or metal of interest. If the spectral signatures do match, this indicates that the mineral of interest is present in candidate rock formation 40', and, accordingly, in a known location of the target region 12, which is also evidence of a geological mineral vein 16 containing the mineral of interest underground, beneath, or near the target region 12.

Figure 10:
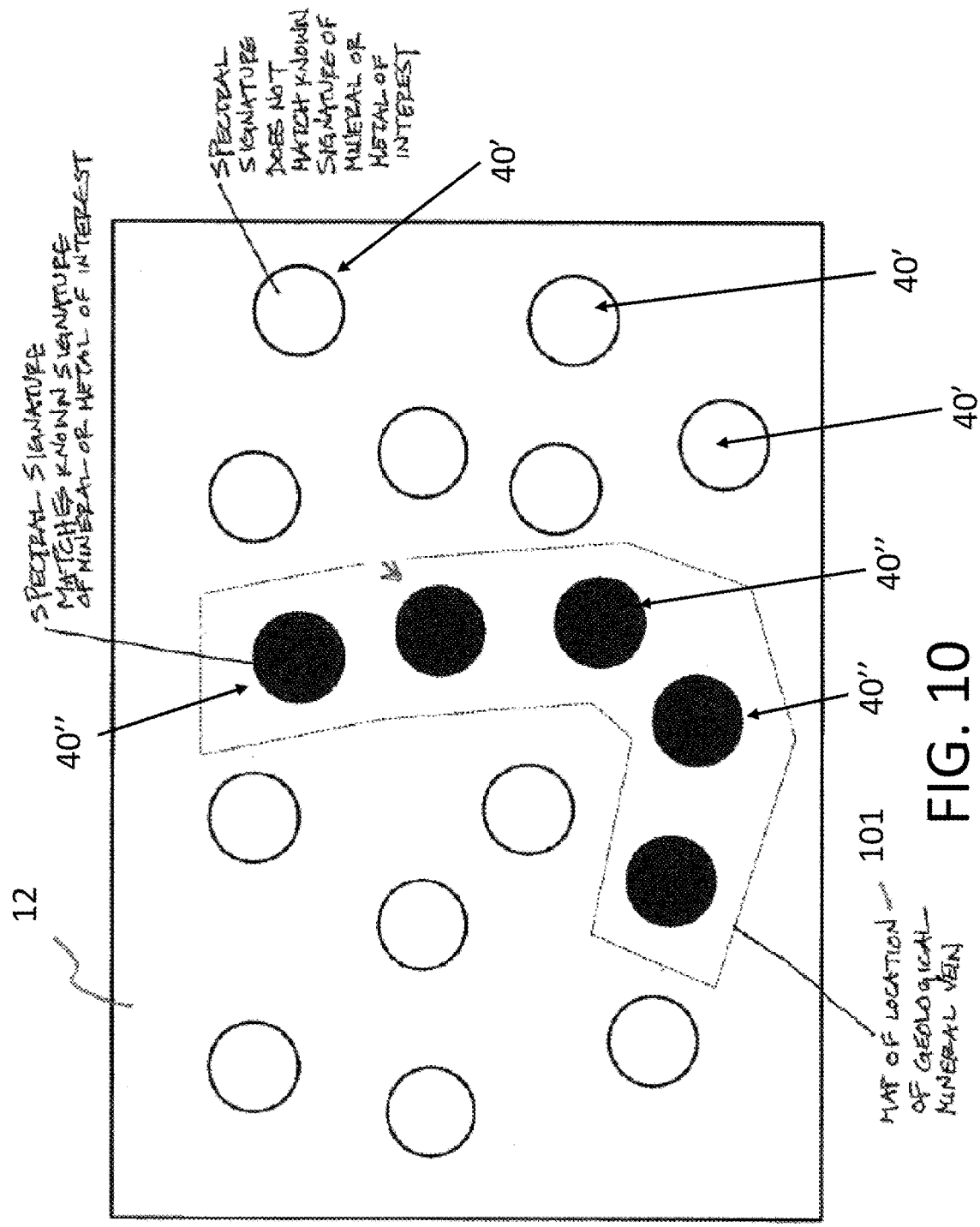
FIG. 10 shows an exemplary plot of land that has been analyzed for the presence of a geological mineral vein using the methods disclosed herein.

In step 808, this process is optionally repeated on any detected rock formations 40 in the target region, as well as optionally repeated for at least one other target region 12 lying on the plot of land 10. After carrying out this process on one or more rock formations 40 or on one or more target regions 12 on the plot of land 10, illustrative embodiments generate a map of the potential location of the geological mineral vein 16 based on the results of the spectral analysis (step 810) after recording and categorizing all of the positive detections (step 809). As noted, candidate rock formation 40' that produced spectral signatures matching the known spectral signature of the mineral of interest can indicate that a geological mineral vein 16 containing the mineral of interest is present underground or near the target region 12. Multiple locations of candidate rock formations 40' and subsequent detections of desired minerals or metals can increase the likelihood that a vein 16 is present. Conversely, target regions 12 where no candidate rock formation 40' produced spectral signatures matching the known spectral signature of the mineral of interest are unlikely to have a geological mineral vein 16 containing the mineral of interest running underground beneath or near them. Based on this information, illustrative embodiments generate a map (101 as shown in FIG. 10) of the approximate location of the geological mineral vein 16, which subsequently can be excavated to extract the mineral of interest from the geological mineral vein 16.

Figure 9:
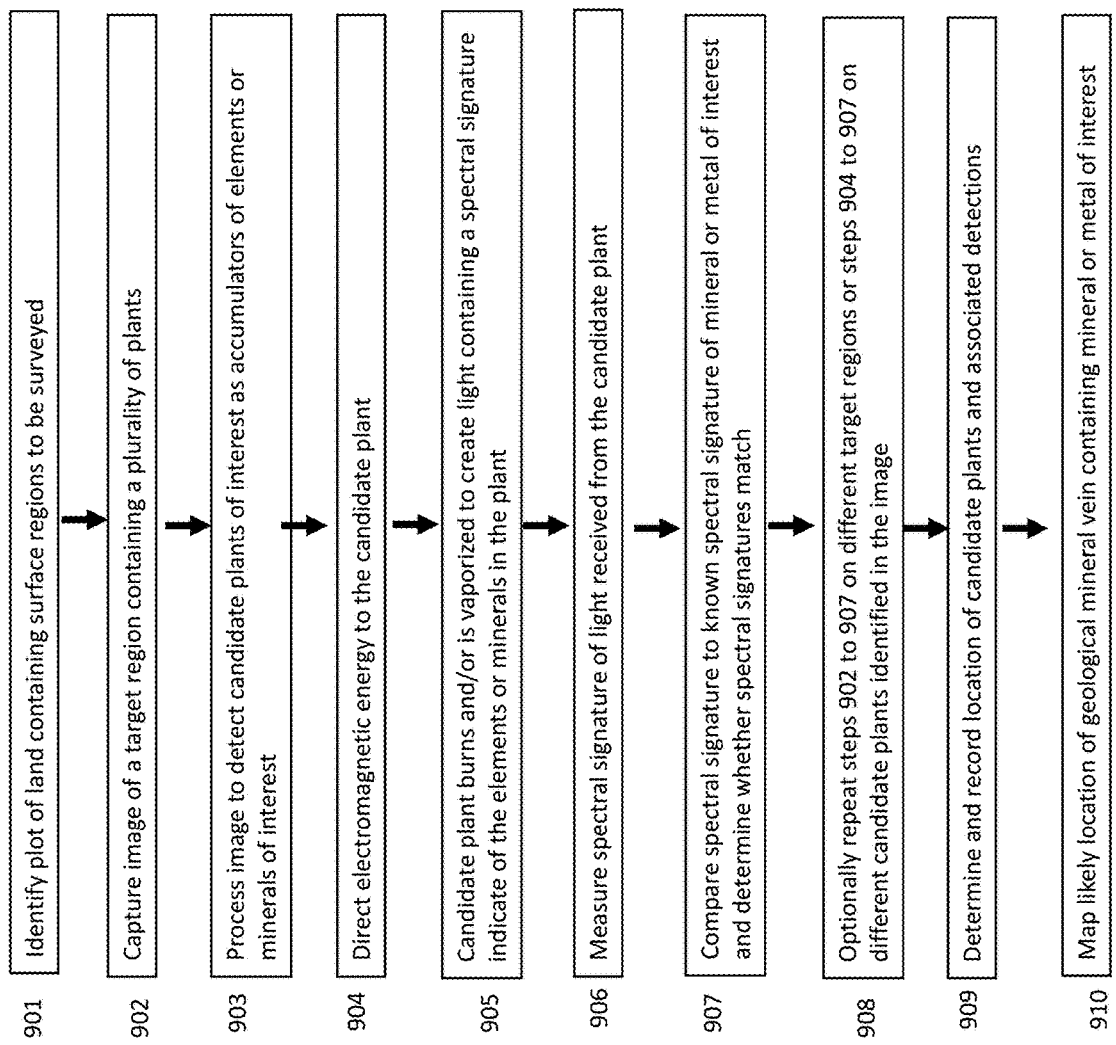
FIG. 9 shows a process of mapping geological mineral or element veins by locating and resting candidate plants in accordance with illustrative embodiments.

FIG. 9 shows a process of mapping geological mineral or element veins 16 by locating and resting candidate plants 42' in accordance with illustrative embodiments. It should be noted that this process is substantially simplified from a longer process that normally may be used to locate the mineral vein 16. Accordingly, the process of locating the mineral vein 16 may have many steps, such as follow-up testing steps or extraction steps, which those skilled in the art may use. In addition, some of the steps may be performed in a different order than that shown, or at the same time. Those skilled in the art therefore can modify the process as appropriate. Moreover, as noted above and below, many of the devices and structures noted are but one of a wide variety of different devices and structures that may be used. Those skilled in the art can select the appropriate devices and structures depending upon the application and other constraints. Accordingly, discussion of specific devices and structures is not intended to limit all embodiments.

The method begins at step 901, which identifies a plot of land 10 for surveying. The plot of land 10 ideally has a likelihood of containing one or more accumulating plants (e.g., known by their particular desired climate and terrain) such that more than one target regions 12 on the land can be interrogated with a reasonable change of successfully finding accumulator plants 42. Next, at step 902, a camera captures an image of the foliage in a target region. At step 903, the image is processed to detect plants 42 of interest that are identified as being able to be accumulate one or more desired minerals in order to later make a determination of their mineral content. At step 904, a device directs electromagnetic energy toward a candidate plant 42' in the target region 12 on the plot of land 10. This energy source may be any energy source capable of causing at least an exposed portion of the candidate plant 42' to burn or vaporize, or otherwise emit light, in response to the received electromagnetic energy (e.g., from a laser or microwave emitter).

In step 905, when the electromagnetic radiation (e.g., light) is directed toward the candidate plant 42', at least a portion of the candidate plant 42' generates a light signature 50 according to one or more of many different processes depending on the frequency and strength of the electromagnetic radiation. According, at step 906, a spectral measurement device absorbs and then measures the spectrum of the emitted light signature 50 at step 905. In some examples, the minerals in the candidate plant 42' also emit light at specific frequencies in response to the absorbed light due to, for example, fluorescence. Among other things, as noted above, the spectral device may include an optical spectrometer, spectrophotometer, spectrograph, or, a spectroscope. The spectral signature of the emitted light is anticipated to read from about 320 nm to about 1000 nm, although other ranges may be used. Step 906 then compares the measured spectral signature (e.g., light signature) to the known spectral signature of one or more minerals of interest, such as silver, cobalt, iron, copper, cadmium, lead, mercury, selenium, manganese, zinc, molybdenum and nickel. Step 907 then determines whether the spectral signatures match a known spectral signature of a mineral or metal of interest. If the spectral signatures do match, this indicates that the mineral of interest is present in candidate plant 42', and, accordingly, in the ground of the target region 12, which is also evidence of a geological mineral vein 16 containing the mineral of interest underground, beneath, or near the target region 12.

In step 908, this process is optionally repeated on any detected accumulator plants 42 in the target region, as well as optionally repeated for at least one other target region 12 lying on the plot of land 10. After carrying out this process on one or more accumulator plants 42 or on one or more target regions 12 on the plot of land 10, illustrative embodiments generate a map of the potential location of the geological mineral vein 16 based on the results of the spectral analysis (step 910) after recording and categorizing all of the positive detections (step 909). As noted, candidate plants 42' that produced spectral signatures matching the known spectral signature of the mineral of interest can indicate that a geological mineral vein 16 containing the mineral of interest is present underground or near the target region 12. Multiple locations of candidate plants 42' and subsequent detections of desired minerals or metals can increase the likelihood that a vein 16 is present. Conversely, target regions 12 where candidate plants 42' produced spectral signatures matching the known spectral signature of the mineral of interest are unlikely to have a geological mineral vein 16 containing the mineral of interest running underground beneath or near them. Based on this information, illustrative embodiments generate a map (101 as shown in FIG. 10) of the approximate location of the geological mineral vein 16, which subsequently can be excavated to extract the mineral of interest from the geological mineral vein 16.

FIG. 10 shows an exemplary target region 12 that has been analyzed for the presence of a geological mineral vein using the methods disclosed herein. The target region 12 has produced a plurality of candidate rock formations 40', according to examples disclosed herein, and, of those, a second plurality confirmed of rock formation 40'' tested positive for a desired mineral. That is, having confirmed spectral signatures matching the known spectral signature of the mineral of interest are depicted by black-filled circles. Candidate rock formations 40' that did not produce spectral signatures matching the known a signature of the mineral of interest are depicted by open circles and the confirmed rock formations 40" are depicted by filled circles. Based on this information, the probable location of a geological mineral vein 16 containing the mineral of interest is determined in the target region 12, as depicted by the area within the dotted line. This area can then be excavated to extract the mineral vein 16 containing the mineral of interest. The mapping of FIG. 10 can also be done using accumulator plants 42, where the open circles represent tested accumulator plants 42 (e.g., candidate plants 42') with a negative or below threshold detection of one or more minerals or interest, and the filled circles represent candidate plants 42' with a positive detection.

Alternative embodiments avoid the need for the investigations per target region 12 by continuously scanning the ground as the illumination region and, in some examples, the device itself, moves across the ground. For example, a human operator carrying a device could investigate the ground around of them as they walk, and the device could indicate if a positive detection is made. Similarly, a device carried by a vehicle, such as a drone, could traverse and scan a ground region and generate a map or list of locations where positive detections were made. In some examples, various embodiments of the disclosure generate a map of the surface mineral content in a region by scanning the region and detecting both the presence and the boundaries between different types of minerals and illustrating the corresponding bounds as a map, which could be overlaid with an existing map.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method of locating a mineral or metal in the ground, the method comprising:
   capturing an image of a target region of the surface of the ground, the target region having exposed rock;
   processing the image to detect a visual signature indicative of the presence of a mineral or metal in the exposed rock;
   determining a candidate location in the target region having the visual signature;
   transmitting electromagnetic radiation to exposed rock in the candidate location to produce a light signature;
   receiving electromagnetic energy from the target region comprising the light signature;
   analyzing the light signature for the presence of the mineral or metal in the candidate location; and
   determining that the light signature indicates the mineral or metal is present in the ground.

2. The method of claim 1, wherein transmitting electromagnetic radiation to the rock causes a chemical reaction to occur in the rock, and wherein the light signature is produced by the chemical reaction.

3. The method of claim 2, wherein the chemical reaction includes vaporization of a portion of the rock in the candidate location into a plasma, and wherein the light signature is produced by the plasma.

4. The method of claim 1, comprising transmitting electromagnetic radiation to rock with a frequency that is absorbed by the mineral or metal in the rock, and wherein the light signature is produced by the absorption of the electromagnetic radiation.

5. The method of claim 1, comprising transmitting electromagnetic radiation to rock with a frequency that causes fluorescence of one or more frequencies in a mineral present in the rock and the light signature comprises the one or more frequencies of the fluorescence.

6. The method of claim 1, wherein the light signature is detected using spectroscopy.

7. The method of claim 1, wherein the electromagnetic radiation is transmitted to the rock from an energy source including a microwave device or a laser.

8. The method of claim 1, wherein the electromagnetic radiation is directed to the rock using a handheld device.

9. The method of claim 1, wherein the electromagnetic radiation is directed to the rock while flying over the target region.

10. The method of claim 1, wherein the visual signature comprises a color or pattern indicative of the mineral or metal.

11. The method of claim 1, comprising determining a location of the rock in the candidate region.

12. The method of claim 11, wherein determining a location of the rock or the candidate region comprises receiving a GPS location where the image was captured and calculating a location of the rock in the candidate region based on the GPS location.

13. The method of claim 1, comprising adjusting a property of the electromagnetic radiation based on the visual indication.

14. The method of claim 1, wherein processing the image to detect the visual signature includes interfacing with a database of visual signatures for a plurality of minerals and metals and comparing the captured image against the database.

15. A system for detecting a mineral or metal, the system comprising:
an rock-locating apparatus comprising:
a camera capable of capturing an image of a target region of the surface of the ground, the target region having exposed rock,
an image processor configured to detect a visual signature indicative of the presence of a mineral or metal in the exposed rock, and determine a candidate location in the target region having the visual signature, and
an output configured to transmit the location of the candidate location; and
a rock-testing apparatus comprising:
an input capable of receiving the location of the candidate location,
an energy source capable of transmitting electromagnetic radiation to exposed rock in the candidate location to produce a light signature, and
a spectroscope configured to receive and analyze the light signature and determine whether the light signature is indicative of the mineral or metal.

16. The system of claim 15, wherein the energy source is capable of transmitting electromagnetic radiation to the exposed rock for causing a chemical reaction to occur in the rock, and wherein the light signature is produced by the chemical reaction.

17. The system of claim 16, wherein the energy source is capable of causing vaporization of a portion of the rock in the candidate location into a plasma, and wherein the light signature is produced by the plasma.

18. The system of claim 15, wherein the energy source is capable of transmitting electromagnetic radiation to the exposed rock with a frequency that is absorbed by the mineral or metal, and wherein the light signature is produced by the absorption of the electromagnetic radiation.

19. The system of claim 15, the energy source is capable of transmitting electromagnetic radiation to the exposed rock with a frequency that causes fluorescence of one or more frequencies in a mineral present in the rock and the light signature comprises the one or more frequencies of the fluorescence.

20. The system of claim 1, wherein energy source is a microwave device or a laser.

21. The system of claim 15, wherein at least one of the rock-locating apparatus or the rock-testing apparatus is sized and shaped to be operated as a handheld device.

22. The system of claim 15, wherein at least one of the rock-locating apparatus or the rock-testing apparatus is configured to operate while flying over the target region.

23. The system of claim 15, wherein the visual signature comprises a color or pattern indicative of the mineral or metal.

24. The system of claim 15, wherein the rock-locating apparatus comprises a processor for determining a location of the rock in the candidate region.

25. The system of claim 24, wherein the rock-locating apparatus comprises a GPS unit configured to receive a GPS location of the rock-locating apparatus, and wherein the processor is configured to calculate a location of the rock in the candidate region based on the GPS location.

26. The system of claim 25, wherein the processor is configured to calculate a location of the rock in the candidate region based on the GPS location and the received light signature when the rock-testing apparatus is positioned with the rock-locating apparatus.

27. The method of claim 15, wherein the rock-locating apparatus comprises a database of visual signatures for a plurality of minerals and metals, and wherein the image processor is configured to interface with the database and comparing the captured image against the database to detect the visual signature.

28. The system of claim 27, wherein the rock-testing apparatus is configured to receive the visual signature from the rock-locating apparatus and adjust a property of the electromagnetic radiation based on the visual indication.

29. The system of claim 15, comprising a housing containing the rock-testing apparatus and the rock-locating apparatus.

30. A method of locating a mineral or metal in the ground, the method comprising:
capturing an image of a target region of a plot of land;
processing the image to detect a plant rooted in in the target region capable of accumulating a mineral or metal from the plot of land;
determining a candidate plant of the target region based on the detecting;
transforming the candidate plant by causing at least a portion of the candidate plant to burn to produce a light signature;
analyzing the light signature for the presence of the mineral or metal in the candidate plant; and
determining that the light signature indicates the mineral or metal is present in the candidate plant.

31. The method of claim 30, comprising determining a location of the candidate plant in the plot of land.

32. The method of claim 30, wherein the light signature is detected using spectroscopy.

33. The method of claim 30, wherein the mineral or metal is selected from the group consisting of gold, silver, ruthenium, rhodium, palladium, osmium, iridium, magnesium, and manganese.

34. The method of claim 30, wherein transforming the plant comprises directing an energy source onto the at least a portion of the plant while the plant is rooted in the plot of land.

35. The method of claim 34, wherein the energy source is a microwave device, or a laser.

36. The method of claim 34, wherein the energy source is directed to the at least a portion of the plant using a handheld device.

37. The method of claim 34, wherein the energy source is directed to the at least a portion of the plant while flying over the plant.

38. A system for detecting a mineral or metal, the system comprising:
   an plant-locating apparatus comprising:
      a camera capable of capturing an image of a target region of a plot of land,
      an image processor configured to determine the presence and location of a candidate plant rooted in the target region that is capable of accumulating a mineral or metal from the plot of land, and
      an output configured to transmit the location of the candidate plant; and
   a plant-testing apparatus comprising:
      an input capable of receiving the location of the candidate plant,
      an energy source capable of transforming the candidate plant by causing at least a portion of the plant to burn to produce a light signature, and
      a spectroscope configured to analyze the light signature and determine whether the light signature is indicative of the mineral or metal.

39. The system of claim 38, wherein the mineral or metal is selected from the group consisting of gold, silver, ruthenium, rhodium, palladium, osmium, iridium, magnesium, and manganese.

40. The system of claim 38, wherein the energy source is a microwave device or a laser.

41. The system of claim 38, wherein at least one of the plant-locating apparatus or the plant-testing apparatus is handheld.

42. The system of claim 38, wherein at least one of the plant-locating apparatus or the plant-testing apparatus is configured to be coupled to an aircraft.

43. The system of claim 38, wherein the spectroscope includes a comparator to compare the light signature to a known light signature of the mineral or metal.

44. The system of claim 38, wherein the plant-locating apparatus comprises a processor for determining a location of the plant in the candidate region.

45. The system of claim 38, wherein the plant-locating apparatus comprises a GPS unit configured to receive a GPS location of the plant-locating apparatus, and wherein the processor is configured to calculate a location of the plant in the candidate region based on the GPS location.

46. The system of claim 38, wherein the processor is configured to calculate a location of the plant in the candidate region based on the GPS location and the received light signature when the plant-testing apparatus is positioned with the plant-locating apparatus.

47. The method of claim 38, wherein the plant-locating apparatus comprises a database of visual signatures for a plurality of minerals and metals, and wherein the image processor is configured to interface with the database and compare the captured image against the database to detect the visual signature.

48. The system of claim 38, wherein the plant-testing apparatus is configured to receive the visual signature from the plant-locating apparatus and adjust a property of the electromagnetic radiation based on the visual indication.

49. The system of claim 38, comprising a housing containing the plant-testing apparatus and the plant-locating apparatus.

50. The system of claim 38, wherein the spectroscope includes a comparator to compare the light signature to a known light signature of the mineral or metal.

* * * * *